Jan. 24, 1956       A. M. ROCKWOOD ET AL       2,731,849
POWER TRANSMISSION CONTROL

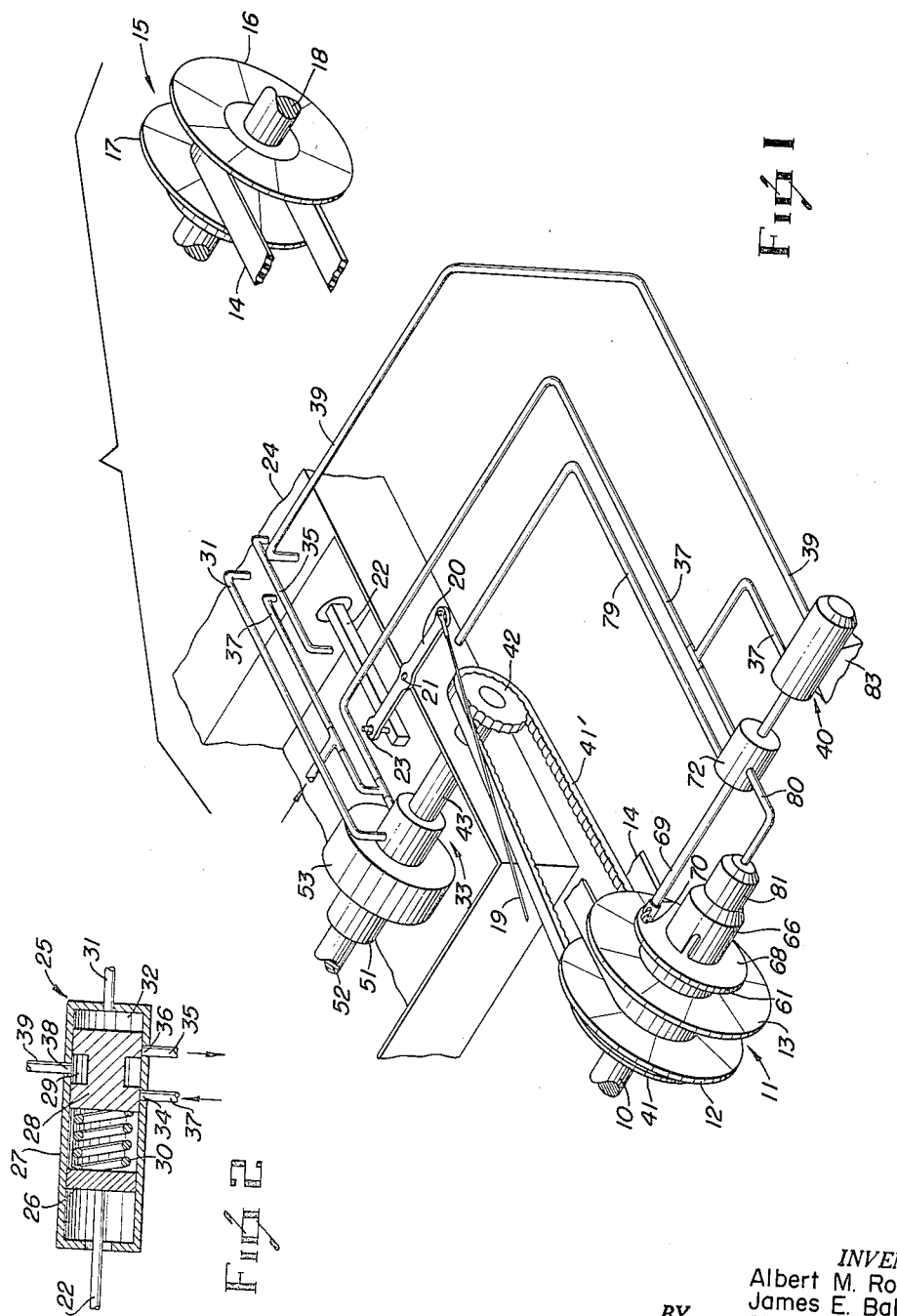

Filed Sept. 8, 1952                                    7 Sheets—Sheet 2

INVENTORS.
Albert M. Rockwood
James E. Ballmer
Claude Hector May

BY *Gray, Mase,*
*Wildermuth & Dunson*
ATTORNEYS.

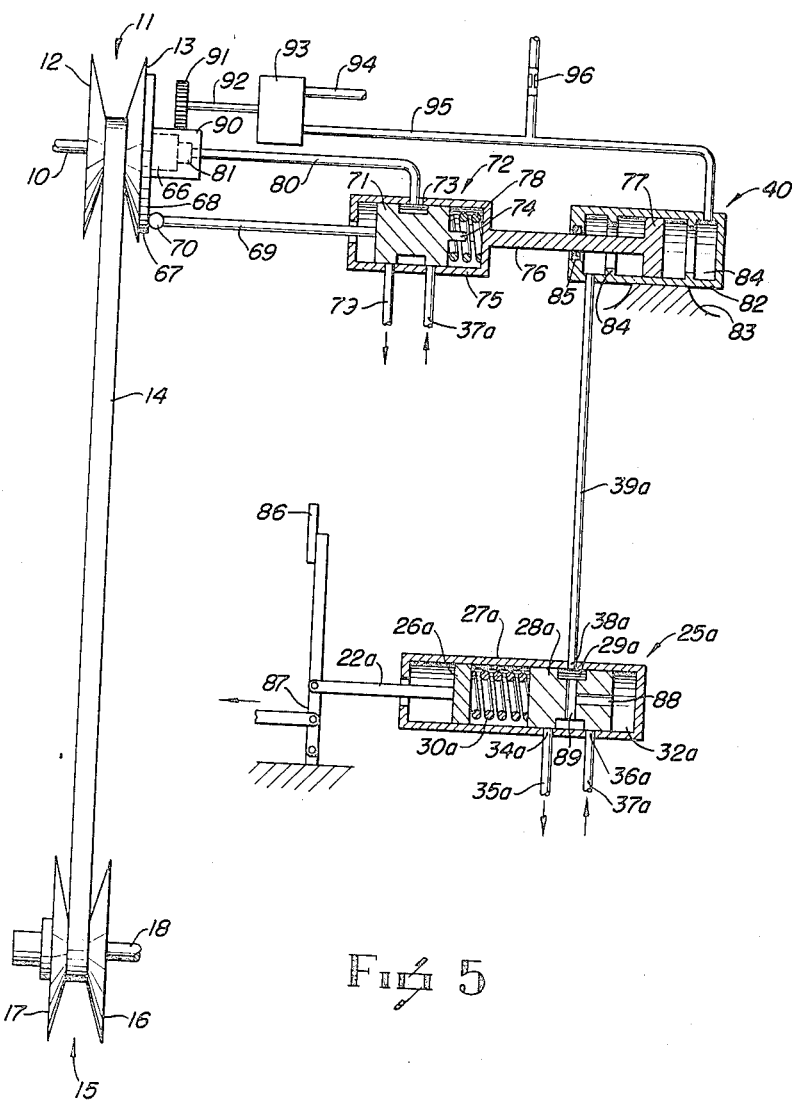

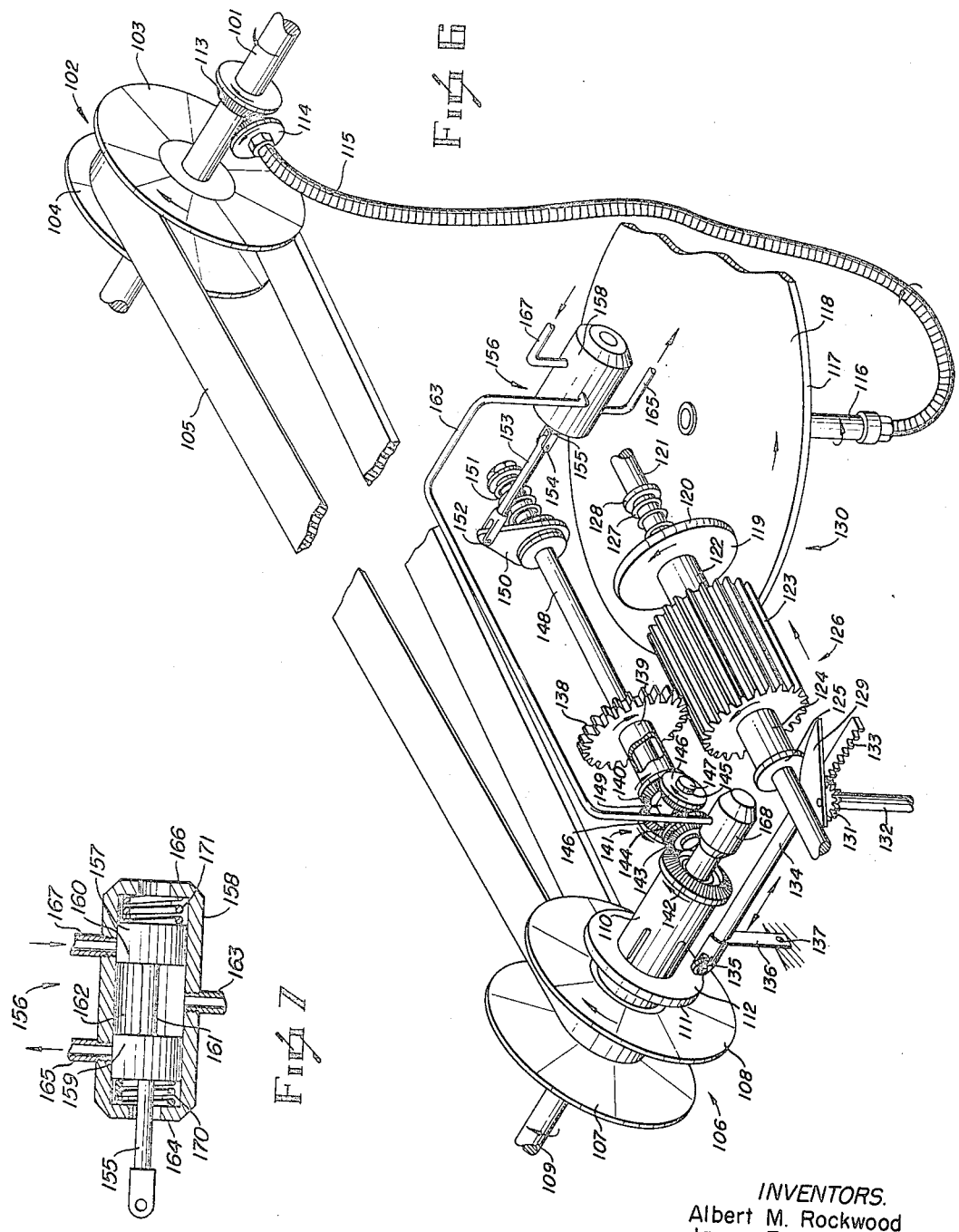

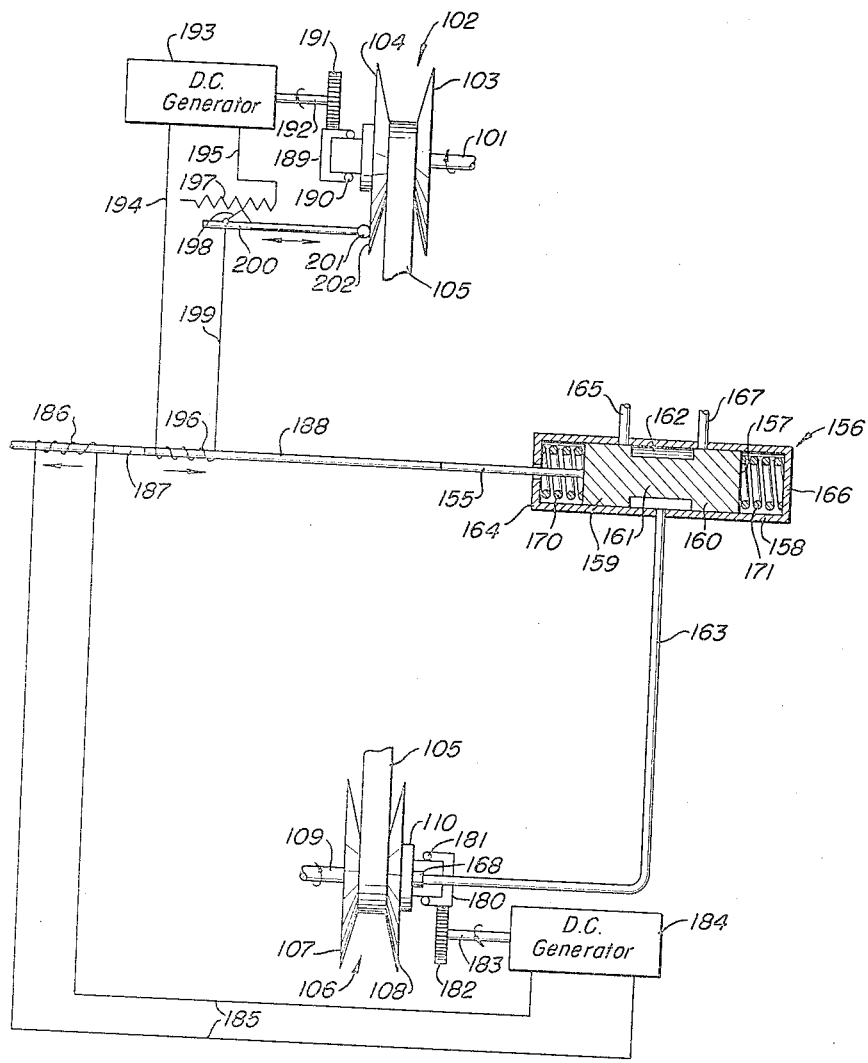

Jan. 24, 1956

A. M. ROCKWOOD ET AL 2,731,849

POWER TRANSMISSION CONTROL

Filed Sept. 8, 1952

INVENTORS.
Albert M. Rockwood
James E. Ballmer
Claude Hector May

BY

*Gray, Mase,
Wildermuth & Dunson*
ATTORNEYS.

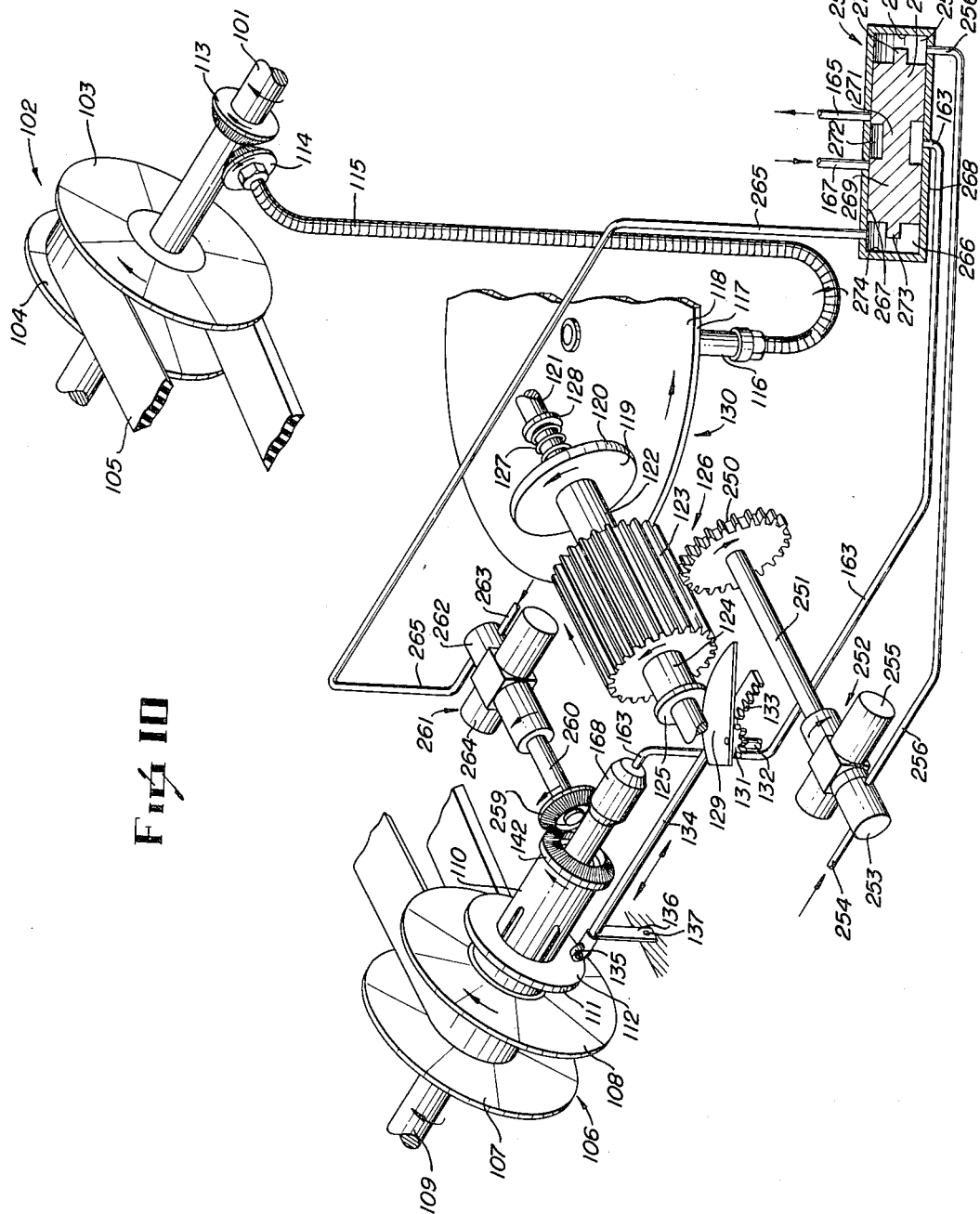

United States Patent Office 2,731,849
Patented Jan. 24, 1956

2,731,849

POWER TRANSMISSION CONTROL

Albert M. Rockwood, Columbus, James E. Ballmer, Canal Winchester, and Claude Hector May, Columbus, Ohio, assignors, by direct and mesne assignments, to The Murray Corporation of America, Detroit, Mich., a corporation of Delaware Application September 8, 1952, Serial No. 308,482

38 Claims. (Cl. 74—472)

This invention relates to power transmission control. It has to do, more particularly, with means for controlling the gear ratio in variable gear-ratio belt-drive transmissions, and with means for controlling belt slippage in belt-drive transmissions.

Some of the objects of this invention are: to provide improved fully automatic, highly efficient control means in a power transmission, the instantaneous gear ratio of which may vary in a continuous manner, as contrasted with a stepwise manner of variation; to provide means for controlling the instantaneous gear ratio in such power transmissions in such manner as to enable the driving means to operate under conditions of maximum efficiency, such as by automatically providing a constant speed in such driving means for a given power setting; to provide such control means in the form of simple, compact and inexpensive apparatus; to provide in such power transmission means for shifting rapidly and noiselessly from one extreme available instantaneous gear ratio to the opposite extreme available instantaneous gear ratio, or between any other gear ratios within the available range; and to provide increased belt life by means of automatic control over belt slippage in belt-drive transmissions.

It is a primary object of this invention to provide, in variable gear-ratio transmissions, means for controlling the gear-ratio so as to provide instantaneous gear ratios in accordance with predetermined desired performance characteristics throughout the range of available power-control settings in the driving means employed, over a wide range of load conditions, and for a wide range of desired output speeds.

As used to transmit power from driving means having a power control, the present invention provides in a variable gear-ratio transmission having a driver pulley including a fixed flange and a movable flange, connected by a belt to a driven pulley having a fixed flange and a movable flange, means for controlling the gear ratio between the driver pulley and the driven pulley. This control means includes a combination of means responsive to the combination of the setting of the power control and the speed of the driving means, and means responsive to these combination-responsive means, to control the position of the movable flange of the driver pulley. As a variation of this combination, the control means may comprise a combination of means responsive to the setting of the power control, means responsive to the speed of the driving means, and means responsive to the combination of the two foregoing means, to control the position of the movable flange of the driver pulley.

It is also an object of this invention to provide gear-ratio control means having the general characteristics described above, and providing other features and advantages that will be apparent from the disclosure herein.

It is another important object of the present invention to provide means for obtaining the optimum value of belt slippage over the available range of operating conditions in a transmission in which a belt transmits power from one pulley to another.

This invention provides means for continuously providing predetermined values of belt slippage in a transmission having a driver pulley, a driven pulley, and a belt between the two pulleys. The slippage-control means includes a combination of means for providing a signal that is a function of the speed of rotation of the driver pulley, means for providing a signal that is a function of the speed of rotation of the driven pulley, means for modifying one of these signals in accordance with the instantaneous gear ratio and a predetermined desired value of belt slippage for that gear ratio, and means responsive to any difference between this modified signal and the other signal, to provide a variation in belt slippage such as to substantially eliminate such signal difference.

It is a further object of this invention to provide belt-slippage control means having the general characteristics described above, and providing other features and advantages that will be apparent from the disclosure herein.

In the drawings:

Figure 1 is a perspective view, partially schematic, and with parts cut away, illustrating a preferred embodiment of means for controlling the gear ratio in a variable gear-ratio transmission according to the present invention;

Figure 2 is an elevational view, in cross section, showing details of a control valve forming a part of the control means of Figure 1;

Figure 5 is a schematic view, partially in section, illustrating a modification of the means shown in Figure 1 for controlling the gear ratio in a variable gear-ratio transmission;

Figure 6 is a perspective view, partially schematic, and with parts cut away, illustrating a preferred embodiment of belt-slippage control means according to the present invention;

Figure 7 is an elevational view, partially in section, showing details of a valve forming a part of the belt-slippage control means of Figure 6;

Figure 8 is a schematic view, partially in section, showing a modification of the belt-slippage control of this invention;

Figure 10 is a perspective view, partially schematic, partially in section, and with parts cut away, illustrating still another modification of the belt-slippage control of this invention.

Figure 3:
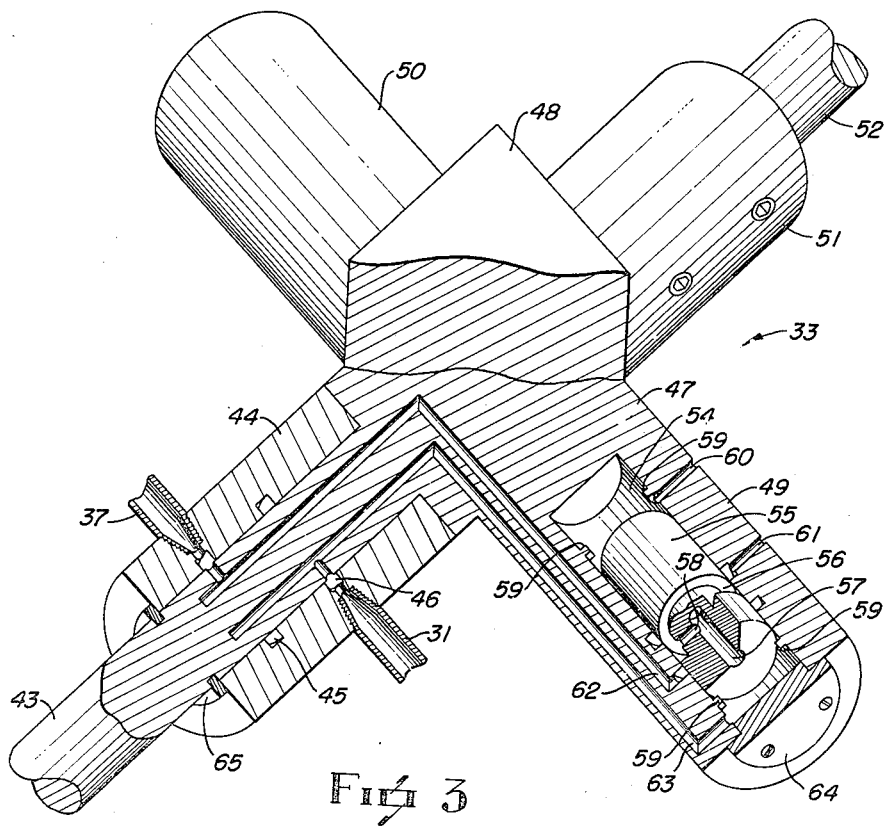
Figure 3 is a perspective view, partially in section, of a fluid-pressure-type governor forming a part of the control means of Figure 1.

Referring now to Figure 1, which illustrates a preferred embodiment of means for controlling the gear ratio in a variable gear-ratio transmission, an automobile engine, or other driving means, is connected in any suitable manner to drive a driver shaft 10, which drives a driver pulley 11, comprising a fixed flange 12 and a movable flange 13, which is axially slidable with respect to the driver shaft 10, but is rotatably fixed thereto. A continuous belt 14 provides a driving connection from the driver pulley 11 to a driven pulley 15, comprising a fixed flange 16 and a movable flange 17, which is axially slidable with respect to a load shaft 18 but is rotatably fixed thereto. The movable flange 17 of the driven pulley 15 may be maintained pressed against the belt 14 in any suitable manner, such as by the belt-slippage control disclosed herein, or by other fluid pressure means such as those illustrated in Figures 1 and 11 of the co-pending application for U. S. Letters Patent of Claude Hector May, Serial No. 216,183. The driven pulley 15 is connected to the load shaft 18, which may be connected through a suitable clutch and reduction gears to a driving wheel of an automobile, or may be connected to drive other equipment, as desired.

The driving means to which the driver shaft 10 is connected is provided with a power control, such as the usual throttle control of an internal combustion engine linked to a throttle pedal, as is customary in automobiles. The power control is connected through a linkage comprising a rod 19 and a pivot arm 20, which is pivoted at 21, to vary the position of a piston shaft 22 connected thereto, as is indicated at 23. In a housing 24 is located a ratio-pressure control valve 25, details of which are illustrated in Figure 2. The piston shaft 22 is connected to control the position of a piston 26 which is slidable within a stationary cylindrical casing 27. The position of the piston 26 in the casing 27 is determined by the power-control setting through the linking members 19 and 20 and the piston shaft 22. Also slidably mounted in the cylindrical casing 27 is a cylindrical valve-output piston 28 provided with an annular groove 29. Between the power-setting piston 26 and the valve-output piston 28 is a helical spring 30, which applies force against the valve piston 28 in accordance with the positon of the power-setting piston 26. To oppose the force applied through the power-setting piston 26 and the spring 30, which tends to force the valve piston 28 toward the right, a fluid line 31 connects the cylindrical space 32, between the valve piston 28 and the right-end wall of the casing 27 of the valve 25, to fluid under pressure as controlled by a fluid pressure-type governor 33.

In Figure 2, the valve piston 28 is shown in a balanced or neutral position. In this position, the annular groove 29 is located to the left of an opening 36 to which is connected one end of a drain-fluid line 35, the other end of which is connected to any suitable sump in which only a low pressure, in the order of 20 p. s. i., is present, and the annular groove 29 of the valve piston 28 is located to the right of an opening 34, to which is connected one end of a supply-pressure line 37, the other end of which is connected to any suitable source of fluid under pressure, preferably in the order of 400 p. s. i. In the neutral position shown in Figure 2, the valve piston 28 covers both of the openings 34 and 36 and the annular groove 29 is located between the openings 34 and 36. With the valve piston 28 in this neutral position, the middle of the annular groove 29 registers with an opening 38 in the casing 27, to which is connected one end of a ratio-control-pressure fluid line 39, the other end of which is connected to a ratio-controlled cylinder 40.

A first fixed pulley 41, rigidly connected to the driver shaft 10, drives a second fixed pulley 42 by means of a continuous belt 41', to provide rotation of the second fixed pulley 42 at a speed proportional to the speed of the driving means and of the driver shaft 10. This rotation is applied to a rotatable shaft 43 of the governor 33, since the fixed pulley 42 is rigidly connected to the shaft 43. Figure 3 illustrates details of the governor 33. Referring to Figure 3, the shaft 43 of the governor 33 is rotatably mounted in a stationary sleeve 44. An annular groove 45 in the stationary sleeve 44 is connected to one end of the supply-pressure line 37. A second annular groove 46 in the stationary sleeve 44 is connected to one end of the governor-signal-pressure fluid line 31, the other end of which is connected to the cylindrical space 32 in the control valve 25. The rotatable portion of the governor 33 is a body 47 comprising a central block portion 48, a cylindrical valve portion 49, a cylindrical axial portion 51, and the counterweight 50, a cylindrical axial portion 51, and the cylindrical shaft 43. The axial portion 51 is connected to a shaft 52, which is in line with the shaft 43 and supports the governor 33 at the end opposite the shaft 43. In Figure 1, a housing 53 is shown enclosing the central block portion 48, the cylindrical valve portion 49, and the cylindrical counterweight 50.

The cylindrical valve portion 49 of the governor 33 is provided with a cylindrical valve bore 54 containing a cylindrical governor valve-piston 55. The governor piston 55 is provided with an annular passage 56, a central passage 57, and a transverse passage 58 between the annular passage 56 and the central passage 57. The governor piston 55 is slidable in the valve bore 54 and its travel is limited by stops 59—59 near each end of the valve bore 54. Two vents are provided, communicating with the valve bore 54 as indicated at 60 and 61. A supply-fluid passage 62 is provided, as shown, to communicate between the annular groove 45 in the stationary sleeve 44 and the valve bore 54 of the valve portion 49. A governor-signal-pressure fluid passage 63 communicates between the annular groove 46 in the stationary sleeve 44 and the valve bore 54 of the valve portion 49, as shown. A fluid-tight end cap 64 is provided over the outer end of the valve bore 54. A retaining ring 65 holds the rotatable body 47 in fluid-tight rotatable relationship with the stationary sleeve 44.

The gear ratio between the driver pulley 11 and the driven pulley 15 is determined by the position of the movable flange 13 of the driver pulley 11. The position of the movable flange 13 is controlled by controlling the fluid pressure applied against the movable flange 13 through a movable-flange control 66, which may comprise any suitable means for applying fluid pressure against the movable flange 13, such as that illustrated in Figure 5 of the co-pending application for U. S. Letters Patent of Claude Hector May, Serial No. 216,183, or that illustrated in Figure 12 of the same co-pending application.

Figure 4:
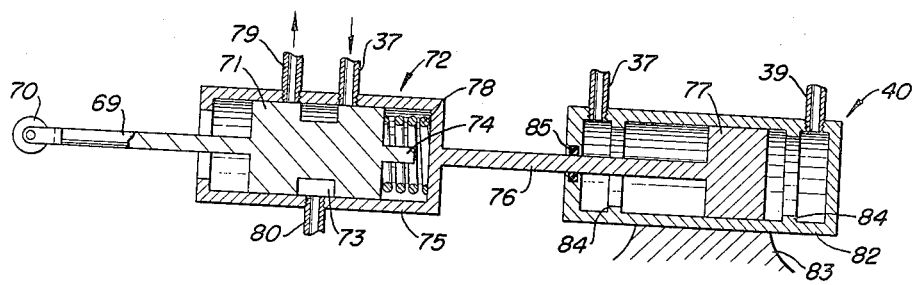
Figure 4 is an elevational view, largely in section, showing details of a valve combination forming a part of the control means of Figure 1.

Rigidly connected to the movable flange 13 is a flange backing ring 67, which has a flat surface 68 perpendicular to the driver shaft 10. A flange-follower rod 69 has at one end an antifriction wheel 70 which bears against the flat surface 68 of the movable-flange backing ring 67. The other end of the flange-follower rod 69 is rigidly connected to a slidable valve piston 71 of a driver-pressure control valve 72. Details of the driver-pressure control valve 72 and of the ratio-control cylinder 40 associated therewith are illustrated in Figure 4. The slidable piston 71 of the control valve 72 is cylindrical in shape, and is provided with an annular groove 73 and a right-end projection 74. The valve piston 71 is contained in a cylindrical casing 75, which is fixedly connected by a shaft 76 to a slidable cylindrical piston 77 in the ratio-control cylinder 40. To the right of the valve piston 71 in the cylindrical casing 75 is a helical spring 78.

In Figure 4, the valve piston 71 is shown in its neutral or balanced position within the casing 75 of the driver-pressure control valve 72. In this neutral position, the annular groove 73 is located between a drain-fluid line 79 connected to the valve 72, to the left of the neutral position of the annular passage 73, and the supply pressure line 37 connected to the valve 72 to the right of the neutral position of the annular passage 73. The drain-fluid line 79 is connected to any suitable sump, in which fluid line 79 is connected to any suitable sump, in which only a low pressure, in the order of 20 p. s. i., is present. A driver-pulley pressure-control line 80 is connected to the driver-pressure control valve 72 at the center of the neutral position of the annular passage 73. The driver-pulley pressure-control line 80 is connected through a rotary seal 81 to the movable-flange control 66 to apply fluid pressure against the movable flange 13 of the driver pulley 11.

The cylindrical piston 77 of the ratio-control cylinder 40 is slidable within a cylindrical casing 82, which is rigidly attached to a stationary member 83 to maintain the casing 82 of the ratio-control cylinder 40 in fixed spaced relationship with the fixed flange 12 of the driver pulley 11. Two stops 84—84 limit the travel of the slidable piston 77. An O-ring seal 85 provides a fluid-tight seal between the shaft 76 and the ratio-control cylinder casing 82. The supply pressure line 37 is connected to the left end of the ratio-control cylinder 40, and the ratio control-pressure fluid line 39 from the ratio-pressure control valve 25 is connected to the right end of the ratio-control cylinder 40.

The gear-ratio control of Figures 1 through 4 operates as follows:

For a given load and a given power setting, a predetermined gear ratio, as fixed by the position of the movable flange 13 of the driver pulley 11, is obtained between the driver pulley 11 and the driven pulley 15 for the balanced conditions shown in Figures 2 through 4. As the power-control setting of the driving means is varied by the operator in such manner as to tend to increase the power and speed of the driving means, the piston shaft 22 is moved toward the right by the linkage comprising the rod 19 and the pivot arm 20. The piston shaft 22 moves the cylindrical piston 26 of the ratio-pressure-control valve 25 toward the right (see Figure 2) pressing against the helical spring 30, and forcing the valve output piston 28 toward the right against the governor-signal fluid pressure applied through the fluid line 31 to the cylindrical space 32 to the right of the piston 28. The movement of the piston 28 to the right uncovers the opening 36 and permits fluid to escape from the annular passage 29 through the drain-fluid line 35.

The drain-fluid line 35 is connected from the annular passage 29 through the power-control-signal pressure fluid line 39 to the cylindrical space to the right of the valve piston 77 in the cylindrical casing 82 of the ratio-control cylinder 40 permitting the fluid-pressure therein to decrease (see Figure 4). The decreased fluid pressure to the right of the piston 77 in the ratio-control cylinder 40 permits the greater pressure from the left to force the piston 77 to the right. Since the cylindrical casing 75 of the driver-pressure control valve 72 is fixedly connected by the shaft 76 to the valve piston 77, the casing 75 is likewise forced toward the right. The movement of the cylindrical casing 75 of the driver-pressure control valve 72 toward the right connects the annular passage 73 in the piston 71 with the drain-fluid line 79, permitting a reduction in the fluid pressure in the movable flange control 66 through the rotary seal 81, the fluid line 80, the annular passage 73, and the drain-fluid line 79.

Because of this reduction in fluid pressure against the movable flange 13 of the driver pulley 11, the pressure of the belt 14 against the movable flange 13, resulting from the tension in the belt 14, causes the movable flange 13 to move to the right and to reduce the gear ratio between the driver pulley 11 and the driven pulley 15. The flat surface 68 of the flange-backing ring 67 presses against the antifriction wheel 70 of the flange-follower rod 69, forcing the flange-follower rod 69 and the valve piston 71, rigidly connected thereto, toward the right against the force of the helical spring 78, until the piston 71 shuts off the opening to the drain-fluid line 79, and prevents any further decrease in the fluid pressure against the movable flange 13 of the driver pulley 11.

The reduction in gear ratio between the driver pulley 11 and the driven pulley 15 effected by the foregoing action reduces the load on the driving means. This reduction in load, and the increased power setting which the operator has provided, permit the speed of the driving means to increase. The increased speed of the driving means is transmitted through the driver shaft 10, the first fixed pulley 41, the belt 41', the second fixed pulley 42, and the shaft 43 to the rotatable member 47 of the fluid-pressure-type governor 33, causing an increase in the governor-signal fluid pressure in the fluid line 31 and in the cylindrical space 32 to the right of the piston 28 in the ratio-pressure control valve 25. The operation of the fluid-pressure-type governor 33 will now be described in order to explain this governor-signal fluid-pressure increase.

The fluid-pressure-type governor 33, shown in detail in Figure 3, provides in the governor-signal-pressure fluid line 31 a fluid pressure that is substantially proportional to the square of the speed of rotation of the rotatable body 47 thereof. Fluid under pressure, preferably in the order of 400 p. s. i., is supplied from any suitable source through the supply-fluid line 37 to the annular groove 45 in the stationary sleeve 44 of the fluid-pressure-type governor 33. As the rotatable member 47 rotates, the supply-fluid passage 62 is maintained continuously in communication with the supply fluid-pressure line 37 through the annular passage 45. The governor-signal-pressure fluid line 31 is connected to the other annular groove 46 in the stationary sleeve 44. During rotation of the rotatable member 47 the governor-signal-pressure fluid passage 63 continuously communicates with the governor-signal-pressure fluid line 31 through the annular passage 46.

When the speed of rotation of the rotatable member 47 is such that the centrifugal force on the governor-valve-piston 55 in the valve portion 49 is equal to the fluid pressure in the cylindrical space between the valve piston 55 and the end cap 64; which pressure is also present in the fluid passage 63, the annular passage 46, and the governor-signal-pressure fluid line 31; the governor-valve-piston 55 is maintained in its balanced position, as shown in Figure 3, in which the supply-pressure passage 62 is covered by the piston 55 and in which the vent 61 is also covered by the valve 55. In this condition, the governor-signal pressure remains constant at a value determined by the speed of rotation of the rotatable member 47 of the governor 33.

If the speed of rotation of the rotatable member 47 increases, the centrifugal force on the governor valve piston 55 is increased, and the piston 55 moves outward from the axis of rotation, connecting the annular passage 56 of the governor valve piston 55 with the supply-pressure fluid passage 62. The fluid under pressure from the supply-fluid passage 62 is admitted through the annular passage 56, the transverse passage 58 and the central passage 57 in the governor-valve piston 55 to increase the pressure in the cylindrical space between the valve piston 55 and the end cap 64 until this pressure reaches a value sufficient to balance the increased centrifugal force on the valve piston 55 and to return the piston 55 to its balanced position, as shown in Figure 3. This increased pressure, which is present also in the fluid passage 63, the annular passage 46, and the governor-signal-pressure fluid line 31, is maintained as long as the speed of rotation of the rotatable member 47 remains constant.

If the speed of rotation of the rotatable member 47 decreases, the centrifugal force on the governor-valve piston 55 is decreased and the greater force from the fluid pressure in the cylindrical space between the piston 55 and the end cap 64 forces the valve piston 55 toward the axis of rotation, connecting the vent 61 to the annular passage 56 in the valve piston 55. Fluid is thus permitted to escape from the cylindrical space between the valve 55 and the end cap 64 through the central passage 57, the transverse passage 58, the annular passage 56 and the vent 61. The escape of fluid through the vent 61 continues until the fluid pressure in the cylindrical space between the piston 55 and the end cap 64 is reduced to a value such that the reduced centrifugal force present on the valve piston 55 is no longer exceeded by the fluid pressure against the piston 55, and the valve piston 55 returns to its balanced position, as shown in Figure 3. Thus, the fluid pressure in the cylindrical space between the governor-valve piston 55 and the end cap 64, which pressure is also present in the fluid passage 63, the annular passage 46, and the governor-signal-pressure fluid line 31, is reduced in accordance with the reduced speed of rotation of the rotatable member 47 of the governor 33. The stops 59—59 near each end of the valve bore 54 limit the inward and outward travel of the governor piston 55. The vent 60 is provided to avoid any compression action in the portion of the valve bore 54 between the governor piston 55 and the axis of rotation.

From the foregoing discussion, it is apparent that the governor-signal pressure present in the fluid line 31 increases and decreases respectively with increase and decrease of the speed of rotation of the rotatable member 47 of the fluid-pressure-type governor 33. Tests show that this governor-signal pressure is substantially proportional to the square of the speed of rotation of the movable member 47.

The increased fluid pressure in the cylindrical space 32 to the right of the valve-output piston 28, provided by the governor 33 as a result of the increased speed of the driving means, moves the piston 28 to the left of the neutral position shown in Figure 2, uncovering the opening 34 and admitting fluid under pressure to the cylindrical space to the right of the piston 77 in the ratio-control cylinder 40 through the ratio-control pressure-fluid line 39, the annular passage 29, and the supply-fluid line 37. This increases the fluid pressure to the right of the piston 77 and forces the piston 77 to move to the left in the ratio-control cylinder 40. Since the cylindrical casing 75 of the driver-pressure control valve 72 is fixedly connected by the shaft 76 to the valve piston 77, the casing 75 is likewise moved toward the left. The movement of the cylindrical casing 75 of the driver-pressure control valve 72 toward the left connects the high-pressure fluid supply line 37 with the annular passage 73 in the valve piston 71, thereby increasing the fluid pressure transmitted through the fluid supply line 37, the annular passage 73, the driver-pulley pressure-control line 80, and the rotary seal 81 to the movable-flange control 66.

The increased fluid pressure against the movable flange 13 of the driver pulley 11 forces the movable flange 13 to the left, thereby increasing the gear ratio between the driver pulley 11 and the driven pulley 15. The spring 78 in the driver-pressure control valve 72 presses the valve piston 71, the flange follower rod 69, and the antifriction wheel 70 against the flat surface 68 of the movable-flange backing plate 67, causing the valve piston 71 to move toward the left along with the movement of the movable flange 13. This movement of the movable flange 13 and of the valve piston 71 continues until the piston 71 reaches its balanced position shown in Figure 4, shutting off the fluid supply pressure from the fluid line 37, and preventing any further increase in the fluid pressure against the movable flange 13 of the driver pulley 11. As the gear-ratio increases, the load on the driving means increases, reducing the speed of the driving means and of the rotatable member 47 of the governor 33. Thus, the governor pressure in the cylindrical space 32 is reduced and the piston 28 of the ratio-pressure control valve 25 moves towards the right to its neutral position, as shown in Figure 2, shutting off the opening 34 and preventing any further supply of fluid to the right of the ratio-control-cylinder piston 77. The gear-ratio control system, and the variable gear ratio transmission system controlled thereby, have thus reached a stable or balanced condition, in which a predetermined gear ratio has been provided for the present combination of driving means power-control setting and load conditions.

If, with the transmission and control system in the stable balanced conditions of Figures 2–4, the load should subsequently decrease, the speed of the driving means would thereby be increased and the gear ratio between the driver pulley 11 and the driven pulley 15 would be increased by the same action in the gear-ratio control system as that described above beginning with the discussion of the transmission of the increased speed to the rotatable member 47 of the fluid-pressure-type governor 33.

As the power-control setting of the driving means is varied by the operator in such manner as to tend to reduce the power and speed of the driving means, the piston shaft 22 is moved toward the left by the linkage comprising the rod 19 and the pivot arm 20. The piston shaft 22 moves the cylindrical piston 26 of the ratio-pressure-control valve 25 toward the left (see Figure 2), reducing the pressure against the helical spring 30, and permitting the valve-output piston 28 to move toward the left by means of the governor-signal fluid pressure applied through the fluid line 31 to the cylindrical space 32 to the right of the piston 28. The movement of the piston 28 to the left uncovers the opening 34 and admits fluid under pressure from the supply-pressure-fluid line 37 to the cylindrical space to the right of the piston 77 in the ratio-control cylinder 40 through the ratio-control-pressure fluid line 39, the annular passage 29, and the supply-fluid line 37. This admission of fluid under pressure increases the pressure in the cylindrical space to the right of the piston 77. The piston 77 moves to the left because the force provided by the increased fluid pressure present in the cylindrical space to the right of the valve piston 77 in the ratio-control cylinder 40 exceeds the force against the left end of the valve piston 77. Since the cylindrical casing 75 of the driver-pressure control valve 72 is fixedly connected by the shaft 76 to the valve piston 77, the casing 75 is likewise moved toward the left. The movement of the cylindrical casing 75 of the driver-pressure control valve 72 toward the left connects the high-pressure fluid supply line 37 with the annular passage 73 in the valve piston 71, thereby increasing the fluid pressure transmitted through the fluid supply line 37, the annular passage 73, the driver-pulley pressure-control line 80, and the rotary seal 81 to the movable flange-control 66.

The increased fluid pressure against the movable flange 13 of the driver pulley 11 forces the movable flange 13 to the left, thereby increasing the gear ratio between the driver pulley 11 and the driven pulley 15. The spring 78 in the driver-pressure control valve 72 presses the valve piston 71, the flange follower rod 69, and the antifriction wheel 70 against the flat surface 68 of the movable-flange backing plate 67, causing the valve piston 71 to move toward the left along with the movement of the movable flange 13. This movement of the movable flange 13 and of the valve piston 71 continues until the piston 71 reaches its balanced position shown in Figure 4, shutting off the fluid supply pressure from the fluid line 37, and preventing any further increase in the fluid pressure against the movable flange 13 of the driver pulley 11.

The increase in gear ratio between the driver pulley 11 and the driven pulley 15 effected by the foregoing action increases the load on the driving means. This increase in load, and the reduced power setting which the operator has provided cause the speed of the driving means to decrease. The reduced speed of the driving means is transmitted through the driver shaft 10, the first fixed pulley 41, the belt 41', the second pulley 42, and the shaft 43 to the rotatable member 47 of the fluid-pressure-type governor 33, causing a reduction in the governor-signal fluid pressure in the fluid line 31 and in the cylindrical space 32 to the right of the piston 28 in the ratio-pressure control valve 25.

The reduced fluid pressure in the cylindrical space 32 to the right of the valve-output piston 28 permits the piston 28 to move to the right of the neutral positions shown in Figure 2 uncovering the opening 36, and permitting fluid to escape from the cylindrical space and permitting fluid to escape from the cylindrical space to the right of the piston 77 in the ratio-control cylinder 40 through the ratio-control-pressure fluid line 39, the annular passage 29, and the drain-fluid line 35. This decreases the fluid pressure in the annular passage 29, in the power-control-signal pressure fluid line 39, and in the cylindrical space to the right of the valve piston 77 in the cylindrical casing 82 of the ratio-control cylinder 40. The decreased fluid pressure to the right of the piston 77 in the ratio-control cylinder 40 permits the greater pressure from the left to force the piston 77 to the right. Since the cylindrical casing 75 of the driver-pressure control valve 72 is fixedly connected by the shaft 76 to the valve piston 77, the casing 75 is likewise forced toward the right. The movement of the cylindrical casing 75 of the driver-pressure control valve 72 toward the right connects the annular passage 73 in the piston 71 with the drain-fluid line 79, permitting a reduction in the fluid pressure in the movable-flange control 66 through the rotary seal 81, the fluid line 80, the annular passage 73, and the drain-fluid line 79.

Because of this reduction in fluid pressure against the movable flange 13 of the driver pulley 11, the pressure of the belt 14 against the movable flange 13, resulting from the tension in the belt 14, causes the movable flange 13 to move to the right and to reduce the gear ratio between the driver pulley 11 and the driven pulley 15. The flat surface 68 of the flange-backing ring 67 presses against the anti-friction wheel 70 of the flange-follower rod 69, forcing the flange-follower rod 69 and the valve piston 71, rigidly connected thereto, toward the right against the force of the helical spring 78, until the piston 71 shuts off the opening to the drain-fluid line 79, and prevents any further decrease in the fluid pressure against the movable flange 13 of the driver pulley 11. As the gear-ratio decreases, the load on the driving means decreases, increasing the speed of the driving means and of the rotatable member 47 of the governor 33. Thus, the governor pressure in the cylindrical space 32 is increased and the piston 28 moves toward the left to its neutral position, as shown in Figure 2, shutting off the opening 36 and preventing any further reduction in fluid pressure to the right of the ratio-control-cylinder piston 77. The gear-ratio control system, and the variable gear-ratio transmission system controlled thereby, have thus reached a stable or balanced condition, in which a predetermined gear ratio has been provided for the present combination of driving-means power-control setting and load conditions.

If, with the transmission and control systems in the stable balanced conditions of Figures 2–4, the load should subsequently increase, the speed of the driving means would thereby be decreased and the gear ratio between the driver pulley 11 and the driven pulley 15 would be decreased by the same action in the gear-ratio control system as that described above beginning with the discussion of the transmission of the decreased speed to the rotatable member 47 of the fluid-pressure-type governor 33.

As is typical in servo systems, overshoot and hunting may be present to some extent in the process of obtaining balanced conditions in the valves of this gear-ratio control system. Although the length of the detailed description of the operation of this gear-ratio control might give the impression that the operations described require a considerable length of time, it should be pointed out that the entire automatic control operation takes place very rapidly and that the distances traversed by the movable pistons in the valves to produce balance are very small. As is the case in most servo systems, this gear-ratio control system operates about a balanced condition, and any variation from this balanced condition is instantaneously compensated for, so that for all practical purposes the system can be considered to be continuously maintained in a balanced condition.

To summarize, there has been disclosed in a variable gear-ratio transmission having, a driver pulley 11 connected to driving means provided with a power control, the driver pulley 11 comprising a fixed flange 12 and a movable flange 13, a driven pulley 15 comprising a fixed flange 16 and a movable flange 17, and a belt 14 between the driver pulley 11 and the driven pulley 15; means for controlling the gear ratio between the driver pulley 11 and the driven pulley 15 comprising, in combination: means, including a ratio-pressure control valve 25 and a fluid-pressure-type governor 33, responsive to the combination of the setting of the power control and the speed of the driving means; and means, comprising a ratio-control cylinder 40 and a driver-pressure control valve 72, responsive to the power-speed-combination-responsive means 25, 33, to control the position of the movable flange 13 of the driver pulley 11. The power-speed-combination-responsive means 25 controls the fluid pressure in a fluid line 39 applied to the movable-flange-position-control means 40, 72. The power control includes means, comprising a linkage 19, 20, 21 and a piston shaft 22, for controlling the force applied through a piston 26 and a spring 30 at the left end, or power-control-setting input point, of a valve piston 28 in the power-speed-combination-responsive means 25, 33. The power-speed-combination-responsive means 25, 33 includes the fluid-pressure-type governor means 33 for controlling fluid pressure applied through a fluid line 31 to a cylindrical space 32 at the right end, or driving-means-speed input point, of the valve piston 28 in the power-speed-combination-responsive means 25, 33, in accordance with the speed of the driving means. The movable-flange-position-control means 40, 72, includes a flange-follower rod 69 and a slidable valve piston 71, providing means responsive to the position of the movable flange 13 of the driver pulley 11. The movable-flange-position-control means 40, 72 comprises: a ratio-control cylinder valve 40 having a piston 77 movable in response to the fluid pressure applied through a fluid line 39 from the power-speed-combination responsive means 25, 33; and a driver-pressure control valve 72 having a pair of movable members 75, 71, the movable member 75 being responsive to the position of the piston 77 of the valve 40, the other movable member 71 being responsive to the position of the movable flange 13 of the driver pulley 11. The movable-flange-position-control means 40, 72 controls the pressure in a movable-flange control means 66 applying fluid pressure against the movable flange 13 of the driver pulley 11.

Figure 5 illustrates a modification of the means shown in Figure 1 for controlling the gear ratio in a variable gear-ratio transmission. Referring now to Figure 5, an automobile engine, or other driving means, is connected in any suitable manner, to drive a driver shaft 10, which drives a driver pulley 11, comprising a fixed flange 12 and a movable flange 13, which is axially slidable with respect to the driver shaft 10, but is rotatably fixed thereto. A continuous belt 14 provides a driving connection from the driver pulley 11 to a driven pulley 15, comprising a fixed flange 16 and a movable flange 17, which is axially slidable with respect to a load shaft 18, but is rotatably fixed thereto. The movable flange 17 of the driven pulley 15 may be maintained pressed against the belt 14 in any suitable manner, such as by the belt-slippage control disclosed herein, or by other fluid-pressure means, such as those illustrated in Figures 1 and 11 of the copending application for U. S. Letters Patent of Claude Hector May, Serial No. 216,183. The driven pulley 15 is connected to the load shaft 18, which may be connected to suitable clutch and reduction gears to a driving wheel of an automobile, or may be connected to drive other equipment, as desired.

The driving means to which the driver shaft 10 is connected is provided with a power control, such as the usual throttle control of an internal combustion engine linked to a throttle pedal 86, as is customary in automobiles. The power control is connected through a linkage 87 to the throttle pedal 86 and to a piston shaft 22a. A power-control-signal valve 25a contains a cylindrical piston 26a, to which the piston shaft 22a is connected. The cylindrical piston 26a is slidable within a stationary cylindrical casing 27a. The position of the piston 26a in the casing 27a is determined by the power-control setting through the linkage 87 and the piston shaft 22d, controlled by the throttle pedal 86. Also slidably mounted in the cylindrical casing 27a is a cylindrical valve-output piston 28a provided with an annular passage 29a, a central longitudinal passage 88 in the right half of the piston 28a, and a transverse passage 89 between the central passage 88 and the annular passage 29a. Between the power-setting piston 26a and the valve-output piston 28a is a helical spring 30a, which applies force against the valve piston 28a, in accordance with the position of the power-setting piston 26a.

In Figure 5, the valve piston 28a is shown in a balanced or neutral position. In this position, the annular groove 29a is located to the right of an opening 34a, to which is connected one end of a drain-fluid line 35a, the other end of which is connected to any suitable sump in which only a low pressure, in the order of 20 p. s. i., is present, and the annular groove 29a of the valve piston 28a is located to the left of an opening 36a, to which is connected one end of a supply-pressure line 37a, the other end of which is connected to any suitable source of fluid under pressure, preferably in the order of 400 p. s. i. In the neutral position, shown in Figure 5, the valve piston 28a covers both of the openings 34a and 36a and the annular groove 29a is located between the openings 34a and 36a. With the valve piston 28a in this neutral position, the middle of the annular groove 29a registers with an opening 38a in the casing 27a, to which is connected one end of a power-control-signal-pressure fluid line 39a, the other end of which is connected to a ratio-control cylinder 40. The power-control-signal pressure of the fluid in the line 39a is communicated through the annular passage 29a, the transverse passage 89, and the central passage 88 to the cylindrical space 32a between the right end of the casing 27a and the valve piston 28a. This pressure tends to force the valve piston 28a toward the left in opposition to the force of the spring 30a, which tends to force the valve piston 28a toward the right. When these two opposing forces are equal, the valve piston 28a is maintained in its balanced or neutral position, shown in Figure 5.

A first spur gear 90, which is rigidly connected to the movable flange 13 of the driver pulley 11, is geared to a second spur gear 91. The long spur gear 90 is axially slidable with respect to the second spur gear 91, but is positively geared thereto. The spur gear 91 is rigidly connected to a shaft 92, which drives a positive displacement pump 93. The positive displacement pump 93 receives fluid from any suitable sump through an input fluid line 94, and pumps the fluid, at a rate proportional to its speed of rotation, through an output fluid line 95 and a narrow orifice 96 to a drain or sump, which may, if desired, be the same sump from which the fluid is supplied to the positive displacement pump 93. The fluid pressure in the output fluid line 95 is applied at the right end of the ratio-control cylinder 40. The positive displacement pump 93 can pump fluid into the output line 95 faster than the fluid can escape at low pressure through the narrow orifice 96, and the fluid pressure in the output fluid line 95 and in the right end of the ratio-control cylinder 40 increases as the speed of rotation of the positive displacement pump 93 increases.

The gear ratio between the driver pulley 11 and the driven pulley 15 is determined by the position of the movable flange 13 of the driver pulley 11. The position of the movable flange 13 is controlled by controlling the fluid pressure applied against the movable flange 13 through a movable-flange control 66, which may comprise any suitable means for applying fluid pressure against the movable flange 13, such as that illustrated in Figure 5 of the co-pending application for U. S. Letters Patent of Claude Hector May, Serial No. 216,183, or that illustrated in Figure 12 of the same co-pending application.

Rigidly connected to the movable flange 13 is a flange-backing ring 67, which has a flat surface 68 perpendicular to the driver shaft 10. A flange-follower rod 69 has at one end an antifriction wheel 70, which bears against the flat surface 68 of the movable flange-backing ring 67. The other end of the flange follower-rod 69 is rigidly connected to a slidable valve piston 71 of a driver-pressure control valve 72. The slidable piston 71 of the control valve 72 is cylindrical in shape, and is provided with an annular groove 73 and a right-end projection 74. The valve piston 71 is contained in a cylindrical casing 75, which is fixedly connected by a shaft 76 to a slidable cylindrical piston 77 in the ratio-control cylinder 40. To the right of the valve piston 71 in the cylindrical casing 75 is a helical spring 78.

In Figure 5, the valve piston 71 is shown in its neutral or balanced position in the casing 75 of the driver-pressure control valve 72. In this neutral position, the annular groove 73 is located between a drain-fluid line 79 connected to the valve 72, to the left of the neutral position of the annular passage 73, and the supply pressure line 37a, connected to the valve 72 to the right of the neutral position of the annular passage 73. The drain-fluid line 79 is connected to any suitable sump, in which only a low pressure, in the order of 20 p. s. i., is present. A driver-pulley pressure-control line 80 is connected to the driver-pressure control valve 72 at the center of the neutral position of the annular passage 73. The driver-pulley pressure-control line 80 is connected through a rotary seal 81 to the movable flange control 66 to apply fluid pressure against the movable flange 13 of the driver pulley 11.

The cylindrical piston 77 of the ratio-control cylinder 40 is slidable within a cylindrical casing 82, which is rigidly attached to a stationary member 83 to maintain the casing 82 of the ratio-control cylinder 40 in fixed, spaced relationship with the fixed flange 12 of the driver pulley 11. Two stops 84—84 limit the travel of the slidable piston 77. An O-ring seal 85 provides a fluid-tight seal between the shaft 76 and the ratio-control cylinder casing 82. The output fluid line 95 from the positive displacement pump 93 is connected to the right end of the ratio-control cylinder 40, and the power-setting output-pressure fluid line 39a from the throttle-signal valve 25a is connected to the left end of the ratio-control cylinder 40.

The gear-ratio control of Figure 5 operates as follows:

For a given load and a given power setting, a predetermined gear ratio, as fixed by the position of the movable flange 13 of the driver pulley 11, is obtained between the driver pulley 11 and the driven pulley 15 for the balanced condition shown in Figure 5. As the throttle pedal 86 is pressed toward the right, the setting of the power control in the driving means is modified through the linkage 87 so as to tend to increase the power and speed of the driving means. This pressing of the throttle pedal 86 towards the right also, through the linkage 87, presses the piston shaft 22a and the cylindrical piston 26a of the power-control signal valve 25a toward the right, pressing against the helical spring 30a and forcing the valve-output piston 28a toward the right against the fluid pressure in the cylindrical space 32a. The movement of the piston 28a to the right uncovers the opening 36a and admits fluid under pressure from the supply-pressure fluid line 37a to the annular passage 29a, the transverse passage 89, the central passage 88, and the cylindrical space 32a between the piston 28a and the right end of the valve casing 27a. The fluid pressure builds up until it is equal to the increased pressure of the spring 30a on the valve piston 28a and forces the piston 28a to the left, back to its balanced or neutral position, as shown in Figure 5, in which the piston 28a shuts off the opening 36a preventing any further increase in fluid pressure.

The increased fluid pressure in the cylindrical space 32a and the passages 88, 89, and 29a is transmitted through the power-control-signal pressure fluid line 39a to the annular space to the left of the valve piston 77 in the cylindrical casing 82 of the ratio-control cylinder 40.

This increased fluid pressure to the left of the piston 77 forces the piston 77 to the right against the lower fluid pressure present in the cylindrical space to the right of the valve piston 77 in the ratio-control cylinder 40. Since the cylindrical casing 75 of the driver-pressure control valve 72 is fixedly connected by the shaft 76 to the valve piston 77, the casing 75 is likewise forced toward the right. The movement of the cylindrical casing 75 of the driver-pressure control valve 72 toward the right connects the annular passage 73 in the piston 71 with the drain-fluid line 79, permitting a reduction in the fluid pressure in the movable flange control 66 through the rotary seal 81, the fluid line 80, the annular passage 73, and the drain-fluid line 79.

Because of this reduction in fluid pressure against the movable flange 13 of the driver pulley 11, the pressure of the belt 14 against the movable flange 13 causes the movable flange 13 to move to the right and to reduce the gear ratio between the driver pulley 11 and the driven pulley 15. The flat surface 68 of the flange backing ring 67 presses against the antifriction wheel 70 of the flange-follower rod 69, forcing the flange-follower rod 69 and the valve piston 71, rigidly connected thereto, toward the right against the force of the helical spring 78, until the piston 71 shuts off the opening to the drain-fluid line 79, and prevents any further decrease in the fluid pressure against the movable flange 13 of the driver pulley 11.

The reduction in gear ratio between the driver pulley 11 and the driven pulley 15 effected by the foregoing action reduces the load on the driving means. This reduction in load, and the increased power setting, permit the speed of the driving means to increase. The increased speed of the driving means is transmitted through the driver shaft 10, the driver pulley 11, the first spur gear 90, the second spur gear 91, and the shaft 92 to the positive displacement pump 93, causing the positive displacement pump 93 to pump fluid received from the sump through the input fluid line 94 at a faster rate to the output fluid line 95, thereby increasing the fluid pressure in the fluid line 95 against the orifice 96 and against the right end of the slidable piston 77 in the ratio-control cylinder 40. The increased fluid pressure in the cylindrical space to the right of the valve piston 77 forces the piston 77 back toward the left against the fluid pressure from the power-control-signal-pressure fluid line 39a applied in the annular space to the left of the piston 77. The cylindrical casing 75 of the driver-pressure control valve 72 moves toward the left also, connecting the high-pressure fluid supply line 37a with the annular passage 73 in the valve piston 71, thereby increasing the fluid pressure transmitted through the fluid supply line 37a, the annular passage 73, the driver-pulley pressure-control line 80, and the rotary seal 81 to the movable flange control 66.

The increased fluid pressure against the movable flange 13 of the driver pulley 11 forces the movable flange 13 to the left, thereby increasing the gear ratio between the driver pulley 11 and the driven pulley 15. The spring 78 in the driver-pressure control valve 72 presses the valve piston 71, the flange-follower rod 69, and the antifriction wheel 70 against the flat surface 68 of the movable flange backing plate 67, causing the valve piston 71 to move toward the left along with the movement of the movable flange 13. This movement of the movable flange 13 and of the valve piston 71 continues until the piston 71 reaches its balanced position shown in Figure 5, shutting off the fluid supply pressure from the fluid line 37a, and preventing any further increase in the fluid pressure against the movable flange 13 of the driver pulley 11. The gear-ratio control system, and the variable gear-ratio transmission system controlled thereby, have thus reached a stable or balanced condition, in which a predetermined gear ratio for the present combination of driving-means power-control setting and load conditions has been provided.

If, with the transmission and control systems in the stable balanced condition of Figure 5, the load should subsequently decrease, the speed of the driving means would thereby be increased and the gear ratio between the driver pulley 11 and the driven pulley 15 would be increased by the same action in the gear-ratio control system as that described above beginning with the discussion of the transmission of the increased speed to the positive displacement pump 93.

As pressure applied by the operator against the throttle pedal is reduced, permitting the throttle pedal to move to the left, the setting of the power control in the driving means is modified through the linkage 87 so as to tend to decrease the power and speed of the driving means. This movement of the throttle pedal 86 toward the left may be aided by an external spring, if desired, or may be provided solely by the pressures in the power-control signal valve 25a. In either case, the piston shaft 22a and the cylindrical piston 26a, the helical spring 30a, and the valve-output piston 28a all move to the left. The fluid pressure in the cylindrical space 32a to the right of the valve-output piston 28a moves the piston 28a to the left of the neutral position shown in Figure 5, uncovering the opening 34a and permitting fluid to escape from the cylindrical space 32a through the central passage 88, the transverse passage 89, the annular passage 29a, and the drain-fluid line 35a. The fluid pressure decreases until it is equal to the decreased pressure of the spring 30a on the valve piston 28a, resulting from the movement of the piston 26a to the left. The piston 28a then is forced to the right back to its balanced or neutral position, as shown in Figure 5, in which the piston 28a shuts off the opening 34a preventing any further reduction in fluid pressure.

The decreased fluid pressure in the cylindrical space 32a and the passages 88, 89, and 29a is communicated through the power-control-signal pressure fluid line 39a to the annular space to the left of the valve piston 77 in the cylindrical casing 82 of the ratio-control cylinder 40. This decreased fluid pressure to the left of the piston 77 permits the piston 77 to move to the left because of the higher fluid pressure present in the cylindrical space to the right of the valve piston 77 in the ratio-control cylinder 40. Since the cylindrical casing 75 of the driver-pressure control valve 72 is fixedly connected by the shaft 76 to the valve piston 77, the casing 75 is likewise moved toward the left. The movement of the cylindrical casing 75 of the driver-pressure control valve 72 toward the left connects the high-pressure fluid supply line 37a with the annular passage 73 in the valve piston 71, thereby increasing the fluid pressure transmitted through the fluid supply line 37a, the annular passage 73, the driver-pulley pressure-control line 80, and the rotary seal 81 to the movable flange-control 66.

The increased fluid pressure against the movable flange 13 of the driver pulley 11 forces the movable flange 13 to the left, thereby increasing the gear ratio between the driver pulley 11 and the driven pulley 15. The spring 78 in the driver-pressure control valve 72 presses the valve piston 71, the flange follower rod 69, and the antifriction wheel 70 against the flat surface 68 of the movable flange backing plate 67, causing the valve piston 71 to move toward the left along with the movement of the movable flange 13. This movement continues until the piston 71 reaches its balanced position shown in Figure 5, shutting off the fluid supply pressure from the fluid line 37a, and preventing any further increase in the fluid pressure against the movable flange 13 of the driver pulley 11.

The increase in gear ratio between the driver pulley 11 and the driven pulley 15 effected by the foregoing action increases the load on the driving means. This increase in load, and the decreased power setting, cause the speed of the driving means to decrease. The decreased speed of the driving means is transmitted through the driver shaft 10, the driver pulley 11, the first spur gear 90, the second spur gear 91, and the shaft 92 to the positive displacement pump 93, causing the positive displacement pump 93 to pump fluid received from the sump through the input fluid line 94 at a slower rate to the output fluid line 95, thereby decreasing the fluid pressure in the fluid line 95 against the orifice 96 and against the right end of the slidable piston 77 in the ratio-control cylinder 40. The decreased fluid pressure in the cylindrical space to the right of the valve piston 77 permits the piston 77 to move back toward the right because of the higher fluid pressure from the power-control-signal-pressure fluid line 39a applied in the annular space to the left of the piston 77. The cylindrical casing 75 of the driver-pressure control valve 72 moves toward the right also, connecting the annular passage 73 in the piston 71 with the drain-fluid line 79, and permitting a reduction in the fluid pressure in the movable flange control 66 through the rotary seal 81, the fluid line 80, the annular passage 73, and the drain-fluid line 79. Because of this reduction in fluid pressure against the movable flange 13 of the driver pulley 11, the pressure of the belt 14 against the movable flange 13, resulting from the tension in the belt 14, causes the movable flange 13 to move to the right and to reduce the gear ratio between the driver pulley 11 and the driven pulley 15. The flat surface 68 of the flange backing ring 67 presses against the antifriction wheel 70 of the flange-follower rod 69, forcing the flange-follower rod 69 and the valve piston 71, rigidly connected thereto, toward the right against the force of the helical spring 78, until the piston 71 shuts off the opening to the drain-fluid line 79, and prevents any further decrease in the fluid pressure against the movable flange 13 of the driver pulley 11. The gear-ratio control system, and the variable gear-ratio transmission system controlled thereby, have thus reached a stable or balanced condition, in which a predeterminer gear ratio for the present combination of driving-means power-control setting and load conditions has been provided.

If, with the transmission and control systems in the stable balanced condition of Figure 5, the load should subsequently increase, the speed of the driving means would thereby be decreased and the gear ratio between the driver pulley 11 and the driven pulley 15 would be decreased by the same action in the gear-ratio control system as that described above beginning with the discussion of the transmission of the decreased speed to the positive displacement pump 93.

As is typical in servo systems, overshoot and hunting may be present to some extent in the process of obtaining balanced conditions in the valves of this gear-ratio control system. Although the length of the detailed description of the operation of this gear-ratio control might give the impression that the operations described require a considerable length of time, it should be pointed out that the entire automatic control operation takes place very rapidly and that the distances traversed by the movable pistons in the valves to produce balance are very small. As is the case in most servo systems, this gear-ratio control system operates about a balanced condition, and any variation from this balanced condition is instantaneously compensated for, so that for all practical purposes the system can be considered to be continuously maintained in a balanced condition.

Obviously, the fluid-pressure-type governor 33 of Figures 1 and 3 performs the same function as does the combination of the positive displacement pump 93 and the orifice 96 of Figure 5, namely, to provide a fluid pressure that increases with increased speed of the driving means and of the driver pulley 11. The combination of the positive displacement pump 93 and the orifice 96, of course, could be substituted for the fluid-pressure-type governor 33 in the form of the gear-ratio control of this invention shown in Figure 1, and the gear-ratio control system would function in the same manner. Similarly, the fluid-pressure-type governor 33 could be substituted for the combination of the positive displacement pump 93 and the orifice 96 in the modified form of the gear-ratio control of this invention, illustrated in Figure 5, and the gear-ratio control system would perform in the same manner. The devices are equivalents as far as their application to the gear-ratio control system of the present invention is concerned, since the operation of the system is based upon balanced fluid-pressure conditions and it is important that the output fluid pressure as a function of speed of rotation is not necessarily identical in the two devices. Other devices having the property of providing increased fluid pressure with increased speed of rotation also are equivalents of these devices in the gear-ratio control system of this invention.

Summarizing, there has been disclosed in a variable gear-ratio transmission having, a driver pulley 11 connected to driving means provided with a power control, the driver pulley 11 comprising a fixed flange 12 and a movable flange 13, a driven pulley 15 comprising a fixed flange 16 and a movable flange 17, and a belt 14 between the driver pulley 11 and the driven pulley 15; means for controlling the gear ratio between the driver pulley 11 and the driven pulley 15 comprising, in combination: a power-control-signal valve 25a, providing means responsive to the setting of the power control; a positive displacement pump 93, an orifice 96, and a fluid line 95, providing means responsive to the speed of the driving means; and means, comprising a ratio-control cylinder 40 and a driver-pressure control valve 72, responsive to the combination of the power-control-setting-responsive means 25a and the driving-means-speed-responsive means 93, 95, 96, to control the position of the movable flange 13 of the driver pulley 11. The power-control-setting-responsive means 25a controls the fluid pressure in a fluid line 39a applied at the annular space to the left, or power-control-setting input point, of a piston 77 in the combination-responsive means 40, 72. The driving-means-speed-responsive means 93, 95, 96 comprises means for controlling the fluid pressure applied from a fluid line 95 at the cylindrical space at the right, or driving-means-speed input point, of the piston 77 in the combination-responsive means 40, 72. The combination-responsive means 40, 72 includes a flange-follower rod 69 and a valve piston 71, providing means responsive to the position of the movable flange 13 of the driver pulley 11. The combination-responsive means 40, 72 comprises: a ratio-control cylinder valve 40 having a piston 77 movable in response to the difference between the fluid pressures applied at the input points at each end of the valve 40; and a driver-pressure control valve 72 having a pair of movable members 75, 71, the movable member 75 being responsive to the position of the piston 77 of the valve 40, the other movable member 71 being responsive to the position of the movable flange 13 of the driver pulley 11. The combination-responsive means 40, 72 controls the pressure in the movable-flange control means 66 applying fluid pressure against the movable flange 13 of the driver pulley 11.

It has been found that maximum efficiency of the transmission system can be obtained by controlling the pressure against the belt so as to obtain the optimum value of belt slippage. Tests made under a wide variety of conditions show that the optimum value of slippage, at which maximum efficiency is obtained, can be determined as a function of the gear ratio, which may also be considered in terms of the driver-pulley movable flange position, or of the driven-pulley movable flange position, and that by providing the optimum amount of slippage throughout the range of available gear ratios, maximum efficiency can be maintained. Typical values of optimum belt slippage are in the neighborhood of 5%.

Not only is maximum efficiency obtained by the continuous provision of optimum belt slippage, but also maximum belt life is obtained, since, for any given set of conditions, both driver-pulley pressures and driven-pulley pressures are at a minimum with the optimum value of belt slippage. Side loads on the belt, developed by these pressures, cause the belt to flex and compress, thereby developing heat, which in time may destroy the bond strength within the belt and cause the belt to fail. Consequently, for maximum belt life these driver-pulley pressures and driven-pulley pressures should be kept at minimum values.

Optimum values of belt slippage are provided in the transmission system of this invention by the combination of means for providing a signal that is a function of the speed of rotation of a driver pulley, means for providing a signal that is a function of the speed of rotation of the driven pulley that is connected by a belt to this driver pulley, means for modifying one of these speed-function signals in accordance with the instantaneous gear ratio, and in accordance with the predetermined optimum value of belt slippage for this gear ratio, and means responsive to any difference between the modified speed-function signal and the other speed-function signal to provide a variation in belt slippage such as to substantially eliminate any such signal difference.

A preferred embodiment of such means for continuously providing optimum values of belt slippage is illustrated in Figure 6. Referring to Figure 6, an automobile engine, or other driving means, is connected in any suitable manner to drive a driver shaft 101, which drives a driver pulley 102 comprising a fixed flange 103 and a movable flange 104, which is axially slidable with respect to the driver shaft 101 but is rotatably fixed thereto, the position of which may be controlled in any suitable manner, such as by the gear-ratio control disclosed herein, or by a jackscrew mechanism, as illustrated in Figure 1 of the co-pending application for U. S. Letters Patent of Claude Hector May, Serial No. 216,183, or by other fluid-pressure means, such as that illustrated in Figure 11 of the same co-pending application. A continuous belt 105 provides a driving connection from the driver pulley 102 to a driven pulley 106, comprising a fixed flange 107 and a movable flange 108, which is axially slidable with respect to a load shaft 109 but is rotatably fixed thereto. The driven pulley 106 is connected to the load shaft 109, which may be connected through a suitable clutch and reduction gears to a driving wheel of an automobile, or may be connected to drive other equipment as desired.

The pressure of the driven pulley 106 against the belt 105 is provided by a movable flange control 110, which may comprise any suitable means for applying fluid pressure against the movable flange 108, such as that illustrated in Figure 5 of the co-pending application for U. S. Letters Patent of Claude Hector May, Serial No. 216,183, or that illustrated in Figure 12 of the same co-pending application. Rigidly connected to the movable flange 108 is a flange backing ring 111, which has a flat surface 112 perpendicular to the load shaft 109.

A bevel gear 113, which is rigidly connected to the driver shaft 101, drives a second bevel gear 114, which is connected to one end of a flexible shaft 115. The other end of the flexible shaft 115 is connected to a driving shaft 116 of a rotatable disk 117, having a friction drive face 118. A rotatable roller 119 having a rounded edge 120 contacting the face 118 of the rotatable disk 117, is slidably mounted on a shaft 121 so as to be movable toward and away from the axis of rotation of the rotatable disk 117. Rigidly connected to the roller 119 by a sleeve 122 is a spur gear 123, which is slidable on, and rotatable about, the shaft 121, along with the roller 119. At the end opposite the sleeve 122, the slidable spur gear 123 is rigidly connected by another sleeve 124 to a cam follower 125. The roller 119, the sleeve 122, the spur gear 123, the sleeve 124, and the cam follower 125 comprise a slidable and rotatable member which is indicated generally by the reference numeral 126. The rotatable disk 117 and the slidable member 126 comprise a speed changer, indicated generally by the reference numeral 130. A light spring 127, retained by a ring 128 attached to the shaft 121, presses the slidable member 126 against a cam 129.

The position of the cam 129 is controlled through a pinion 131 on a cam shaft 132, the pinion 131 being driven by a rack 133 on a flange-follower rod 134. The flange-follower rod 134 has at one end an antifriction wheel 135 which bears against the flat surface 112 of the movable flange backing ring 111. Any suitable means, such as a flat spring 136 connected to a fixed point, as is indicated at 137, may be used to press the flange-follower rod 134 against the flat surface 112 of the movable flange backing ring 111, so that the position of the flange-follower rod 134 is determined by the position of the movable flange 108 of the driven pulley 106.

Geared to the long slidable spur gear 123 is a spur gear 138, which is rigidly connected by a sleeve 139 to a driver-end input gear 140 of a differential gear mechanism, indicated generally by the reference numeral 141. A bevel gear 142, which is rigidly connected to the load shaft 109, is geared to a bevel gear 143 which is rigidly connected to a driven-end input gear 144 of the differential gear mechanism 141. A spider 145, comprising a block 149 and a shaft 147 on which two pinion gears 146—146 are rotatably mounted, provides an output rotation to a differential output shaft 148 which is rigidly connected to the block 149 and extends out from the differential gear mechanism 141 through a central opening in the driver-input gear 140 and through the sleeve 139 to a valve-control arm 150. The block 149 is provided with a transverse cylindrical hole in which the shaft 147 of the spider 145 is held. The valve-control arm 150 is connected for turning by the differential output shaft 148 through a clutch assembly 151.

The valve-control arm 150 is pivotably connected by a pin 152 to one end of a connecting rod 153, the other end of which is pivotably connected by a pin 154 to a piston shaft 155 of a driven-pulley pressure control valve indicated generally by the reference numeral 156. Details of the control valve 156 are shown in Figure 7. The piston shaft 155 is rigidly connected to one end of a valve piston 157, which is slidable within a cylindrical casing 158. The valve piston 157 comprises a cylindrical left-end portion 159, and a cylindrical right-end portion 160, rigidly held in fixed spaced relationship by a central connecting shaft 161, which provides an annular space 162 between the left-end portion 159 and the right-end portion 160. A spring 170 between the left end 164 of the control valve 156 and the cylindrical left-end portion 159 of the valve piston 157, together with a spring 171 between the right end 166 of the control valve 156 and the cylindrical right-end portion 160 of the valve piston 157 may be used to hold the valve piston 157 normally in a central position within the casing 158, as shown in Figure 7. A driven-pulley pressure control line 163 is connected to the control valve 156 approximately in the center of the cylindrical casing 158. Between the driven-pulley pressure line 163 and the left end 164 of the control valve 156, a drain-fluid line 165 is connected to the casing 158. Between the driven-pulley pressure line 163 and the right end 166 of the control valve 156, a supply-pressure line 167 is connected to the casing 158. The supply-pressure line 167 is connected to any suitable source of fluid under pressure, preferably in the order of 400 p. s. i. The drain-fluid line 165 is connected to any suitable sump in which only a low pressure in the order of 20 p. s. i. is present The driven-pulley pressure control line 163 is connected through a rotary seal 168 to the movable flange control 110 to apply fluid pressure against the movable flange 108 of the driven pulley 106.

The belt-slippage control of Figures 6 and 7 operates as follows:

The rotation of the driver pulley 102 is applied to the rotatable disk 117 of the speed changer 130 through the bevel gear 113, which is rigidly connected to the driver shaft 101, the bevel gear 114, which is geared to the bevel gear 113, and the flexible shaft 115, which is connected to the driving shaft 116 of the rotatable disk 117. The rotatable roller 119 of the slidable member 126 is driven by the friction drive base 118 of the rotatable disk 117 through the contact of the rounded edge 120 with the base 118 of the rotatable disk 117.

The gear ratio between the driver pulley 102 and the driven pulley 106 is determined by the position of the movable flange 104 of the driver pulley 102 on the driver shaft 101. This gear ratio determines the position of the movable flange 108 of the driven pulley 106 on the load shaft 109. The flange backing ring 111 is rigidly connected to the movable flange 108, the flat surface 112 of the backing ring 111 determines the position of the flange follower 134, in accordance with the position of the movable flange 108, since the antifriction wheel 135 of the flange follower 134 is held against the flat surface 112 of the backing ring 111 by the flat spring 136. The rack 133 on the flange follower 134 is geared to the pinion 131 on the cam shaft 132 to control the position of the cam 129 in accordance with the gear ratio as indicated by the position of the movable flange 108 of the driven pulley 106. The position of the cam 129 determines the position of the slidable member 126 of the speed changer 130, since the cam follower 125 of the slidable member 126 is pressed against the cam 129 by the light spring 127. Thus, the position of the cam 129 determines the gear ratio in the speed changer 130 by controlling the position of the slidable member 126 on the shaft 121 to vary the distance of the roller 119 from the axis of rotation of the rotatable disk 117.

The cam 129 is shaped so as to vary the gear ratio in the speed changer 130 in accordance with the instantaneous gear ratio between the driver pulley 102 and the driven pulley 106, as indicated by the position of the movable flange 108 of the driven pulley 106, and in accordance with predetermined desired values of optimum belt slippage over the available range of gear ratios between the driver pulley 102 and the driven pulley 106. Thus, the output of the speed changer 130, which is transmitted from the long slidable spur gear 123 through the spur gear 138 and the sleeve 139 rigidly connected thereto to the driver-end input gear 140 of the differential gear mechanism 141, is a rotation at a speed that depends upon the speed of rotation of the driver pulley 102, the instantaneous gear ratio between the driver pulley 102 and the driven pulley 106, and the optimum belt slippage for that gear ratio.

The rotation of the driven pulley 106 is transmitted to the driven-end input gear 144 of the differential gear mechanism 141 through the bevel gear 142, which is rigidly connected to the load shaft 109, and the bevel gear 143, which is geared thereto and which is rigidly connected to the driven-end input gear 144. The gear ratios from the driver pulley 102 to the driver-end input gear 140 of the differential gear mechanism 141, and between the driven pulley 106 and the driven-end input gear 144 of the differential gear mechanism 141, are so chosen that the speed of rotation of the driver-end input gear 140 is equal to the speed of rotation of the driven-end input gear 144 for the condition of optimum belt slippage at any available gear ratio between the driver pulley 102 and the driven pulley 106.

In Figure 6, arrows indicate the directions of rotation of the driver shaft 101, the driver pulley 102, the bevel gear 113, the bevel gear 114, the flexible shaft 115, the shaft 116, the rotatable disk 117, the roller 119, the long, slidable spur gear 123, the spur gear 138, and the driver-end input gear 140 of the differential gear mechanism 141. Arrows also indicate the directions of rotation of the driven pulley 106, the load shaft 109, the bevel gear 142, the bevel gear 143, and the driven-end input gear 144 of the differential gear mechanism 141. Arrows indicate in addition the directions of rotation of the pinion gears 146—146 of the differential gear mechanism 141. It is apparent from Figure 6 that the input gears 140 and 144 of the differential gear mechanism 141 rotate in opposite directions, and that when their speeds of rotation are equal, the block 149 of the spider 145 does not move and there is no rotation of the differential output shaft 148. This is the condition that exists when the optimum amount of belt slippage is present between the driver pulley 102 and the driven pulley 106.

If, at any time, the amount of belt slippage decreases to a value below the optimum value of belt slippage, the speed of rotation of the driven pulley 106 increases, and this increased speed of rotation is transmitted through the bevel gear 142 to the bevel gear 143, causing the driven-end input gear 144 to rotate at a speed in excess of the speed of rotation of the driver-end input gear 140 of the differential gear mechanism 141. This excess speed of rotation of the driven-end input gear 144 causes the spider 145 to rotate in the same direction as the direction of rotation of the driven-end input gear 144, thereby rotating the differential output shaft 148 and turning the valve-control arm 150, through the clutch assembly 151, so as to pull the connecting rod 153 toward the left. The connecting rod 153 pulls the piston shaft 155 and the valve piston 157 to the left against the force of the spring 170, connecting the driven-pulley pressure control line 163 with the drain fluid line 165, thereby decreasing the fluid pressure in the movable flange control 110 against the movable flange 108 of the driven pulley 106 to increase the amount of belt slippage. The left end 164 of the casing 158 of the driven-pressure control valve 156, and the spring 170, limit the travel of the valve piston 157 to the left, causing the clutch assembly 151 to slip if the rotation of the differential output shaft 148 is great enough to tend to move the valve piston 157 farther to the left. When the slippage increases to the optimum value, the speed of rotation of the driven-end input gear 144 decreases to a speed equal to that of the driver-end input gear 140 of the differential gear mechanism 141, and the rotation of the spider 145 and the differential output shaft 148 ceases. The spring 170 then moves the valve piston 157 to its central position, as shown in Figure 7, in which the left-hand portion 159 of the valve piston 157 covers the opening to the drain fluid line 165, and the right-hand portion 160 of the valve piston 157 covers the opening to the supply pressure line 167. Thus, the pressure in the driven-pulley pressure line 163, which is applied against the movable flange 108 of the driven pulley 106 through the movable flange control 110, is held at the valve that provides the optimum value of belt slippage.

If, at any time, the belt slippage exceeds the optimum value, the speed of rotation of the driven-end input gear 144 of the differential gear mechanism 141 is decreased below that of the driver-end input gear 140 of the differential gear mechanism 141, causing the spider 145 and the differential output shaft 148 to rotate in the same direction as the rotation of the driver-end input gear 140. This causes the valve-control arm 150, driven through the clutch assembly 151, to push the connecting rod 153 to the right. The connecting rod 153 pushes the piston shaft 155 and the valve piston 157 to the right against the force of the spring 171, connecting the driven-pulley pressure line 163 with the supply pressure line 167. The right end 166 of the casing 158 of the driven pressure control valve 156, and the spring 171, limit the movement of the valve piston 157 to the right, causing the clutch assembly 151 to slip in the event of any rotation of the differential output shaft 148 that would tend to push the valve piston 157 farther to the right. The high pressure of the fluid in the supply pressure line 167 is transmitted through the driven-pulley pressure line 163, the rotary seal 168, and the movable flange control 110 to press the movable flange 108 of the driven pulley 106 tighter against the belt 105. When the belt slippage is reduced to the optimum value, the speed of rotation of the driven-end input gear 144 is increased to equal the speed of rotation of the driver-end input gear 140 of the differential gear mechanism 141. The rotation of the spider 145 and the differential output shaft 148 then ceases, and the spring 171 pushes the valve piston 157 back to its central position, as shown in Figure 7.

From the foregoing description, it is apparent that the belt-slippage control mechanism of Figures 6 and 7 continuously maintains the optimum value of belt slippage for every instantaneous gear ratio. It will be apparent to those skilled in the art that the specific embodiment of the belt-slippage control illustrated in Figure 6 can be varied in a number of ways. For example, the instantaneous gear ratio could be obtained from the position of the movable flange 104 of the driver pulley 102, if desired, instead of from the position of the movable flange 108 of the driven pulley 106. Moreover, the speed changer 130 could be geared to the driven pulley 106 instead of to the driver pulley 102, if desired. Of course, different gear ratios would be required in the speed changer 130 and in the various gears between the differential mechanism 141 and the respective pulleys, and modification in the arrangement of the components would be required, but such changes are well within the skill of the art and do not require further illustration. Although it is preferred to control the amount of belt slippage by controlling the pressure of the movable flange 108 of the driven pulley 106 against the belt 105, the control pressure could, if desired, be applied instead to the movable flange 104 of the driver pulley 102 where such position is controllable by fluid pressure. The slight movement of a movable flange for control of belt slippage is negligible compared to the amount of movement involved in varying the gear ratios between the driver pulley 102 and the driven pulley 106, so the operation of the belt-slippage control with any of the foregoing modifications, or any combination of these modifications, would be equivalent to that of the preferred embodiment illustrated in Figure 6.

As is typical in servo systems, overshoot and hunting may be present to some extent in the process of obtaining a balanced condition in this belt-slippage control system. Although the length of the detailed description of the operation of this belt-slippage control might give the impression that the operations described require a considerable length of time, it should be pointed out that the entire automatic control operation takes place very rapidly and that the distances traversed by the movable valve piston 157 in the driven-pressure control valve 156 to regulate the pressure in the driven-pulley pressure line 163 are very small. As is the case in most servo systems, this belt-slippage control system operates about a balanced condition and any variation from this balanced condition is instantaneously compensated for, so that for all practical purposes the system can be considered to be continuously maintained in a balanced condition.

Figure 8 illustrates a modification of the belt-slippage control of this invention, incorporating electrical means for controlling the driven-pressure control valve 156. Referring to Figure 8, an automobile engine, or other driving means, is connected in any suitable manner to drive a driver shaft 101, which drives a driver pulley 102 comprising a fixed flange 103 and a movable flange 104, which is axially slidable with respect to the driver shaft 101 but is rotatably fixed thereto, the position of which may be controlled in any suitable manner, such as by the gear-ratio control disclosed herein, or by other means discussed herein. A continuous belt 105 provides a driving connection from the driver pulley 102 to a driven pulley 106, comprising a fixed flange 107 and a movable flange 108, which is axially slidable with respect to a load shaft 109 but is rotatably fixed thereto. The driven pulley 106 is connected to the load shaft 109, which may be connected through a suitable clutch and reduction gears to a driving wheel of an automobile, or may be connected to drive other equipment as desired. The pressure of the driven pulley 106 against the belt 105 is provided by a movable flange control 110, which may comprise any suitable means for applying fluid pressure against the movable flange 108, such as the means mentioned herein.

The fluid pressure in the movable flange control 110 is controlled by a driven pressure control valve indicated generally by the reference numeral 156. In the control valve 156, a piston shaft 155 is rigidly connected to one end of a valve piston 157, which is slidable within a cylindrical casing 158. The valve piston 157 comprises a cylindrical left-end portion 159, and a cylindrical right-end portion 160, rigidly held in fixed spaced relationship by a central connecting shaft 161, which provides an annular space 162 between the left-end portion 159 and the right-end portion 160. A spring 170 between the left end 164 of the control valve 156 and the cylindrical left-end portion 159 of the valve piston 157, together with a spring 171 between the right end 166 of the control valve 156, and the cylindrical right-end portion 160 of the valve piston 157, normally hold the valve piston 157 in a central position within the casing 158, as shown in Figure 8. A driven-pulley pressure control line 163 is connected to the control valve 156 approximately in the center of the cylindrical casing 158. Between the driven-pulley pressure line 163 and the left end 164 of the control valve 156, a drain fluid line 165 is connected to the casing 158. Between the driven-pulley pressure line 163 and the right end 166 of the control valve 156, a supply pressure line 167 is connected to the casing 158. The supply pressure line 167 is connected to any suitable source of fluid under pressure. The drain fluid line 165 is connected to any suitable sump in which only a low pressure is present. The driven-pulley pressure control line 163 is connected through a rotary seal 168 to the movable-flange control 110 to apply fluid pressure against the movable flange 108 of the driven pulley 106.

A spur gear 180, which is slidably connected to the load shaft 109, as is indicated at 181, is geared to another spur gear 182 to transmit the rotation of the driven pulley 106 to the shaft 183 of a D. C. electrical tachometer generator 184. The output voltage of the D. C. generator 184, which is directly proportional to the speed of rotation of its armature, is connected by two electrical conductors 185—185 across an electrical coil 186. A section of magnetic material 187, such as steel, in a rod 188, is positioned in the field of the coil 186, and current through the coil 186 produces a magnetic field that tends to move the magnetic material 187 toward the left, as is indicated by the arrow under the coil 186.

A spur gear 189, which is slidably connected to the driver shaft 101, as is indicated at 190, transmits the rotation of the driver pulley 102 through a spur gear 191 geared to the spur gear 189 to the shaft 192 of a D. C. electrical tachometer generator 193. The output voltage of the D. C. generator 193, which is directly proportional to the speed of rotation of its armature, is connected across two electrical conductors 194, 195. The conductor 194 is connected to one end of an electrical coil 196, and the conductor 195 is connected to one end of a variable resistance 197. An electrical contact 198, which is slidable along, and makes electrical contact with, the variable resistance 197, is connected to an electrical conductor 199, which is connected to the opposite end of the coil 196. The position of the slidable contact 198 on the variable resistance 197 is variable in accordance with the position of the movable flange 104 of the driver pulley 102, since the slidable contact 198 is rigidly connected to a flange follower 200, which has at one end an antifriction wheel 201 that is maintained in contact with a flat backing surface 202 on the movable flange 104 of the driver pulley 102. Current through the coil 196 tends to move the magnetic material 197 toward the right, as is indicated by the arrow under the coil 196. The rod 188, of which the section of magnetic material 187 is a part, is connected to the piston shaft 155 to control the position of the valve piston 157.

The gearing to the generators 184 and 193 and the electrical characteristics of the generators 184 and 193, the coils 186 and 196, together with the resistance characteristics of the variable resistance 197 as a function of the position of the slidable contact 198, are so chosen that equal and opposite magnetic forces are produced by the electrical coils 186 and 196 on the section of magnetic material 187 in the rod 188 for the condition of predetermined optimum slippage of the belt 105 at any available gear ratio between the driver pulley 102 and the driven pulley 106.

The belt-slippage control of Figure 8 operates as follows:

The rotation of the driver pulley 102 is applied to the D. C. electrical tachometer generator 193 through the spur gear 189, which is slidably connected to the driver shaft 101, the spur gear 191, which is geared to the spur gear 189, and the generator shaft 192. The output voltage of the generator 193 is connected across the coil 196 through the conductors 194 and 195, the variable resistance 197, the slidable contact 198, and the conductor 199. The voltage across the coil 196 is determined not only by the speed of rotation of the driver pulley 102, which determines the output voltage of the D. C. generator 193 across the conductors 194 and 195, but also by the gear ratio between the driver pulley 102 and the driven pulley 106, as determined by the position of the movable flange 104 of the driver pulley 102, which determines also the position of the flange follower 200 and the slidable electrical contact 198 rigidly connected thereto. The variable resistance 197, the slidable contact 198, and the flange follower 200 are so constructed and positioned as to reduce the voltage from the D. C. generator 193 across the coil 196 in accordance with the instantaneous gear ratio between the driver pulley 102 and the driven pulley 106, as indicated by the position of the movable flange 104 of the driver pulley 102, and in accordance with the predetermined values of optimum belt slippage over the available range of gear ratios between the driver pulley 102 and the driven pulley 106. Thus, the voltage across the coil 196 depends upon the speed of rotation of the driver pulley 102, the instantaneous gear ratio between the driver pulley 102 and the driven pulley 106, and the optimum belt slippage for that gear ratio.

The rotation of the driven pulley 106 is transmitted to the armature of the D. C. generator 184 through the spur gear 180, which is slidably connected to the load shaft 109, as is indicated at 181, the spur gear 182, which is geared to the spur gear 180, and the generator shaft 182. The gear ratios, generator characteristics, resistance characteristics, and magnetic coil characteristics in the control system are so chosen that the magnetic field of the coil 186, acting upon the section of magnetic material 187, is equal and opposite to the magnetic field of the coil 196, acting upon the section of magnetic material 187 for the condition of optimum belt slippage at any variable gear ratio between the driver pulley 102 and the driven pulley 106. Under this condition, which is the normal condition, the section of magnetic material 187 remains centered between the coil 186 and the coil 196, maintaining the valve piston 157, which is connected through the piston shaft 155 to the rod 188, of which the section of magnetic material 187 is a part, in its central position, as shown in Figure 8. The springs 170 and 171 in the driven-pressure control valve 156 help to maintain the valve piston 157 normally in its central position, but these springs 170 and 171 may be omitted, if desired.

If, at any time, the amount of belt slippage decreases to a value below the optimum value of belt slippage, the speed of rotation of the driven pulley 106 increases, and this increased speed of rotation is transmitted through the spur gear 180 to the spur gear 182 and the shaft 183 of the generator 184, causing the voltage across the coil 186 to increase. This increased voltage across the coil 186 produces an increase in the strength of the magnetic field of the coil 186, which pulls the section of magnetic material 187 to the left, thereby moving the rod 188, the piston shaft 155, and the valve piston 157 also to the left against the force of the spring 170. The movement of the valve piston 157 to the left connects the driven-pulley pressure control line 163, through the annular passage 162, to the drain fluid line 165, thereby decreasing the fluid pressure in the movable flange control 110 against the movable flange 108 of the driven pulley 106 to increase the amount of belt slippage. The left end 164 of the casing 158 of the driven-pressure control valve 156, and the spring 170, limit the travel of the valve piston 157 to the left, to prevent any further movement of the valve piston 157 if the voltage across the coil 186 should be great enough to tend to move the valve piston 157 farther to the left. When the slippage increases to the optimum value, the voltage across the coil 186 decreases to a value such as to provide a magnetic field equal in strength to that produced by the coil 196, and the section of magnetic material 187 returns to its normal central position between the coil 186 and the coil 196. The valve piston 157 is thus returned to its central position, as shown in Figure 8, in which the left-hand portion 159 of the valve piston 157 covers the opening to the drain fluid line 165, and the right-hand portion 160 of the valve piston 157 covers the opening to the supply pressure line 167. Thus, the pressure in the driven-pulley pressure line 163, which is applied against the movable flange 108 of the driven pulley 106 through the movable flange control 110, is held at the value that provides the optimum value of belt slippage.

If, at any time, the belt slippage exceeds the optimum value, the speed of rotation of the driven pulley 106 decreases, and this decreased speed of rotation results in a reduction in the voltage across the coil 186. This decrease in voltage across the coil 186 reduces the strength of the magnetic field produced by the coil 186, and permits the section of magnetic material 187 to move to the right because of the stronger pull from the magnetic field of the coil 196 tending to move the section of magnetic material 187 to the right. The rod 188, of which the section of magnetic material 187 is a part, the piston shaft 155, which is connected to the rod 188, and the valve piston 157, which is connected to the piston shaft 155, are thus pushed to the right against the force of the spring 171, connecting the driven-pulley pressure line 163, through the annular passage 162, to the supply pressure line 167. The right end 166 of the casing 158 of the driven-pressure control valve 156, and the spring 171, limit the movement of the valve piston 157 to the right, to prevent any further movement if the magnetic field of the coil 196 should tend to push the valve piston 157 farther to the right. The high pressure of the fluid in the supply pressure line 167 is transmitted through the annular passage 162, the driven-pulley pressure line 163, the rotary seal 168, and the movable flange control 110, to press the movable flange 108 of the driven pulley 106 tighter against the belt 105. When the belt slippage is reduced to the optimum value, the voltage from the D. C. generator 184 across the coil 186 is increased to the value that produces a magnetic field equal and opposite to that produced by the coil 196. The section of magnetic material 187 then returns to its central position between the coil 186 and the coil 196, and the valve piston 157 returns to its central position, as shown in Figure 8.

As is typical in servo systems, overshoot and hunting may be present to some extent in the process of obtaining a balanced condition in this belt-slippage control system. Although the length of the detailed description of the operation of this belt-slippage control might give the impression that the operations described require a considerable length of time, it should be pointed out that the entire automatic control operation takes place very rapidly and that the distances traversed by the movable valve piston 157 in the driven-pressure control valve 156 to regulate the pressure in the driven-pulley pressure line 163 are very small. As is the case in most servo systems, this belt-slippage control system operates about a balanced condition and any variation from this balanced condition is instantaneously compensated for, so that for all practical purposes the system can be considered to be continuously maintained in a balanced condition.

From the foregoing description, it is apparent that the belt-slippage control mechanism of Figure 8 continuously maintains the optimum value of belt slippage for every instantaneous gear ratio. It will be apparent to those skilled in the art that the specific embodiment of the belt-slippage control illustrated in Figure 8 can be varied in a number of ways similar to those discussed in connection with the slippage control of Figures 6 and 7.

Figure 9:
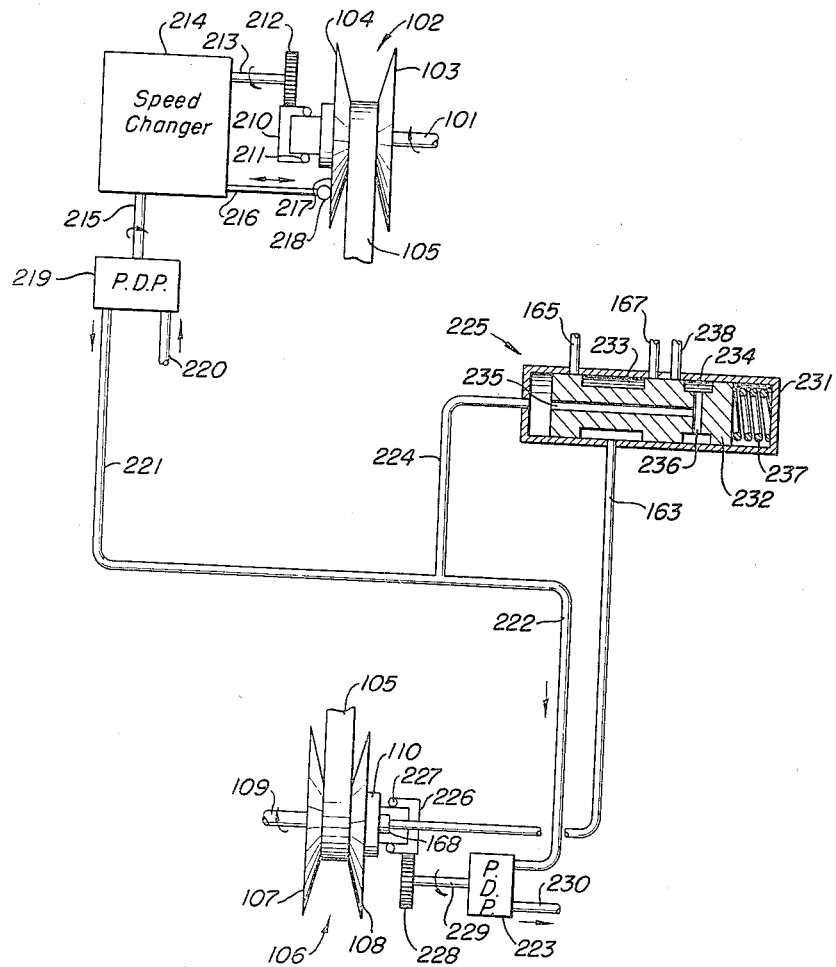
Figure 9 is a schematic view, partially in section, illustrating another modification of the belt-slippage control of this invention.

Referring now to Figure 9, another modification of the means of this invention for continuously providing optimum values of belt slippage is illustrated. An automobile engine, or other driving means, is connected in any suitable manner to drive a driver shaft 101, which drives a driver pulley 102, comprising a fixed flange 103 and a movable flange 104, which is axially slidable with respect to the driver shaft 101 but is rotatably fixed thereto, the position of which may be controlled in any suitable manner, such as by the driver-pressure control, disclosed herein, or by other means discussed herein. A continuous belt 105 provides a driving connection from the driver pulley 102 to driven pulley 106, comprising a fixed flange 107 and a movable flange 108, which is axially slidable with respect to a load shaft 109 but is rotatably fixed thereto. The driven pulley 106 is connected to the load shaft 109, which may be connected through a suitable clutch and reduction gears to a driving wheel of an automobile, or may be connected to drive other equipment as desired. The pressure of the driven pulley 106 against the belt 105 is provided by a movable flange control 110, which may comprise any suitable means for applying fluid pressure against the movable flange 108, such as the means mentioned herein.

A spur gear 210, which is slidably connected to the driver shaft 101, as is indicated at 211, drives a second spur gear 212, which is connected to a shaft 213. The shaft 213 serves as the input shaft of a speed changer 214, which may be similar to the speed changer 130 of Figure 6, in which case the shaft 213 corresponds to the driving shaft 116 of the rotatable disk 117 in the speed changer 130. The output rotation of the speed changer 214 appears on the shaft 215. The ratio of rotation speeds between an the input shaft 213 and the output shaft 215 of the speed changer 214 is determined by the flange follower 216, the position of which is determined by the position of the movable flange 104 of the driver pulley 102, since the antifriction wheel 218 at the end of the flange follower 216 contacts a flat backing surface 217 of the movable flange 104, as is indicated at 218. Thus, the instantaneous ratio provided in the speed changer 214 depends upon the gear ratio between the driver pulley 102 and the driven pulley 106, and, as in the other embodiments of the belt-slippage control of this invention, the ratio in the speed changer 214 is dependent not only upon the gear ratio between the driver pulley 102 and the driven pulley 106, but also upon the optimum value of belt slippage for each available instantaneous gear ratio between the driver pulley 102 and the driven pulley 106. The output shaft 215 of the speed changer 214 drives a positive displacement pump 219, which pumps hydraulic fluid from any suitable sump through a hydraulic fluid input line 220 to a hydraulic fluid output line 221, which has a branch fluid line 222 to deliver hydraulic fluid to a second positive displacement pump 223 and another branch fluid line 224 to apply the pressure in the fluid line 221, 222 to a driven-pressure control valve indicated generally by the reference numeral 225. A spur gear 226, which is slidably connected to the load shaft 109, as is indicated at 227, drives another spur gear 228 connected to a shaft 229. The shaft 229 drives the positive displacement pump 223 which pumps the hydraulic fluid received through the hydraulic fluid input line 222 out through an output fluid line 230, which delivers the fluid back to the sump that furnishes hydraulic fluid to the line 220. The driven-pressure control valve 225 comprises a cylindrical casing 231 and a cylindrical valve piston 232 which is slidably held in the casing 231. The valve piston 232 is provided with an annular cut-away passage 233, an annular cut-away passage 234, a central passage 235, and a transverse passage 236 between the annular passage 234 and the central passage 235. A spring 237 maintains the valve piston 232 in the neutral position shown in Figure 9 against the normal pressure from the hydraulic fluid in the line 224. A driven-pulley pressure control line 163 is connected to the control valve 225 at the center of the neutral position of the annular passage 233. A drain fluid line 165 is connected to the control valve 225 to the left of the neutral position of the annular passage 233. A supply pressure line 167 is connected to the control valve 225 to the right of the neutral position of the annular passage 233. A low-pressure fluid line 238 is connected to the control valve 225 to the left of the annular passage 234. The low-pressure line 238 preferably should be provided with a check valve, which may be of conventional design, to permit the flow of fluid from the line 238 to the control valve 225 but to prevent any flow in the opposite direction. The supply pressure line 167 is connected to any suitable source of hydraulic fluid under pressure. The drain fluid line 165 and the drain fluid line 238 are connected to any suitable sump in which only a low pressure is present. The driven-pulley pressure-control line 163 is connected through a rotary seal 168 to the movable flange control 110, to apply hydraulic pressure against the movable flange 108 of the driven pulley 106.

The belt-slippage control of Figure 9 operates as follows:

The rotation of the driver pulley 102 is applied to the input shaft 213 of the speed changer 214 through the spur gear 210, which is slidably connected to the driver shaft 101, as is indicated at 211, and the spur gear 212 which is geared to the spur gear 210. The speed of rotation of the output shaft 215 of the speed changer 214 is determined by the speed of rotation of the driver pulley 102, the gear ratio between the driver pulley 102 and the driven pulley 106, as applied to the speed changer 214 as a function of the position of the movable flange 104. This movable flange position determines the gear ratio in the speed changer as a function of the position of the flange follower 216, which contacts the flat backing surface 217 of the movable flange 104, as is indicated at 218. The optimum amount of belt slippage for each instantaneous gear ratio between the driver pulley 102 and the driven pulley 106 is accounted for in the design of the speed changer 214, so that the speed of rotation of the output shaft 215 is a function of driver-pulley speed, gear ratio, and optimum belt slippage. The output shaft 215 drives the positive displacemet pump 219, which pumps hydraulic fluid from any suitable sump through the input fluid line 220 and out the output fluid line 221. The rate at which hydraulic fluid is pumped through the positive displacement pump 219 is proportional to the speed of rotation of the shaft 215.

The rotation of the driven pulley 106 is applied to the shaft 229 through the spur gear 226, which is slidably connected to the load shaft 109 as is indicated at 227, and the spur gear 228, which is geared to the spur gear 226. The shaft 229 drives the positive displacement pump 223 at a rate proportional to the speed of rotation of the driven pulley 106. The positive displacement pump 223 pumps hydraulic fluid received through the input fluid line 222 out through the output fluid line 230, returning the hydraulic fluid to the sump that supplies hydraulic fluid to the input line 220 of the positive displacement pump 219. Thus, the two positive displacement pumps 219 and 223 are connected in series to pump hydraulic fluid from a sump through the fluid line 220, the positive displacement pump 219, the fluid line 221, the branch line 222 of the fluid line 221, the positive displacement pump 223, and the fluid line 230, back to the sump. When the rate at which the hydraulic fluid is pumped through the positive displacement pump 219 is equal to the rate at which this hydraulic fluid is pumped away from the pump 219 by the positive displacement pump 223, a pressure head is developed in the fluid lines 221, 222 between the two pumps. This pressure, which is transmitted through the branch 224 of the fluid line 221 to the driven-pressure control valve 225, is just sufficient to maintain the valve piston 232 in its neutral position against the force of the spring 237, as shown in Figure 9. Arrows beside the fluid lines 220, 221, 222, and 230 in Figure 9 indicate the direction in which the hydraulic fluid flows through these fluid lines.

If, at any time, the amount of belt slippage decreases to a value below the optimum value of belt slippage, the speed of rotation of the driven pulley 106 increases, and this increased speed of rotation is transmitted through the spur gear 226 to the spur gear 228 and the shaft 229, causing the positive displacement pump 223 to pump fluid away from its input fluid line 222 to its output fluid line 230 faster than the fluid is being pumped by the positive displacement pump 219 through the fluid lines 221, 222 to the positive displacement pump 223. This causes a reduction in the hydraulic fluid pressure in the lines 221, 222 between the pump 219 and the pump 223, and this reduction in hydraulic fluid pressure, which is transmitted also through the fluid line 224 to the valve piston 232 of the driven-pressure control valve 225, causes the valve piston 232 to be forced to the left by the spring 237. This movement of the valve piston 232 to the left connects the driven-pulley pressure control line 163, through the annular passage 233, to the drain fluid line 165, thereby reducing the hydraulic fluid pressure against the movable flange 108 of the driven pulley 106, and increasing the belt slippage. When the belt slippage has been increased to the optimum value, the pumping rate of the positive displacement pump 223 is reduced to equal the pumping rate of the positive displacement pump 219, and hydraulic fluid is supplied by the positive displacement pump 219 through the fluid lines 221, 222 to the positive displacement pump 223 at the same rate at which the positive displacement pump 223 pumps the hydraulic fluid away from the fluid lines 221, 222, and the pressure in these lines, transmitted through the branch fluid line 224 to the control valve 225 returns to its normal value, causing the valve piston 232 to return to its neutral position, as shown in Figure 9. Thus, the belt slippage is increased to its optimum value, and normal operation prevails.

If the amount of belt slippage should decrease at any time to such an extent as to cause the positive displacement pump 223 to pump fluid at such a high rate as to produce a vacuum in the fluid line 224 and in the control valve 225, the valve piston 232 would be moved still further to the left, so as to connect the annular passage 234 with the low-pressure line 238, and low-pressure fluid from the sump to which the line 238 is connected would flow through the annular passage 234, the transverse passage 236, and the central passage 235 of the valve piston 232, and into the fluid line 224, to supply additional hydraulic fluid to the fluid line 222, and to the positive displacement pump 223, until such condition was corrected by the above-described belt-slippage control action. If a check valve is provided in the low-pressure line 238, as is recommended, to prevent any flow of fluid from the control valve 225 to the line 238, the corrective action is facilitated since the fluid pressure in the line 224 can build up more rapidly than it would if leakage could take place through the line 238.

If, at any time, the belt slippage exceeds the optimum value, the speed of rotation of the driven pulley 106 decreases, and this decreased speed of rotation is transmitted to the positive displacement pump 223, causing the pumping rate of the pump 223 to become slower than the pumping rate of the positive displacement pump 219. Since the positive displacement pump 219 then pumps fluid into the fluid lines 221, 222 faster than the fluid is pumped out of these lines by the positive displacement pump 223, an increased pressure head is developed in the fluid lines 221, 222, and this increased pressure is transmitted through the branch fluid line 224 to the control valve 225, pushing the valve piston 232 toward the right against the force of the spring 227. This movement of the valve piston 232 toward the right connects the supply pressure line 167, through the annular passage 233, to the driven-pulley pressure control line 163, increasing the hydraulic pressure against the movable flange 108 of the driven pulley 106, pressing the movable flange 108 tighter against the belt 105, and thereby reducing the amount of belt slippage. When the amount of belt slippage is reduced to the optimum value, the pumping rate of the positive displacement pump 223 is increased to equal the pumping rate of the positive displacement pump 219, and the hydraulic fluid is pumped away from the fluid lines 221, 222 by the positive displacement pump 223 as fast as it is supplied to these fluid lines by the positive displacement pump 219. Thus, the hydraulic fluid pressure transmitted through the branch fluid line 224 to the control valve 225 returns to normal and the valve piston 232 returns to its neutral position, as shown in Figure 9.

Should the belt slippage, at any time, increase to such extent that the pressure built up between the positive displacement pump 219 and the positive displacement pump 223, because of the reduced pumping rate of the pump 223, were to become excessive, the pressure transmitted through the branch fluid line 224 to the control valve 225, would cause the valve piston 232 to move still farther to the right, connecting the drain fluid line 165 to the fluid line 224, through the left-end space 238 in the control valve 225, permitting the hydraulic fluid to flow out through the drain fluid line 165 to the sump to which it is connected, thereby relieving the pressure in the fluid lines 221, 222, until such pressure was reduced to normal by the above-described belt-slippage control action.

As is typical in servo systems, overshoot and hunting may be present to some extent in the process of obtaining a balanced condition in this belt-slippage control system. Although the length of the detailed description of the operation of this belt-slippage control might give the impression that the operations described require a considerable length of time, it should be pointed out that the entire automatic control operation takes place very rapidly and that the distances traversed by the movable valve piston 232 in the driven-pressure control valve 225 to regulate the pressure in the driven-pulley pressure line 163 are very small. As is the case in most servo systems, this belt-slippage control system operates about a balanced condition and any variation from this balanced condition is instantaneously compensated for, so that for all practical purposes the system can be considered to be continuously maintained in a balanced condition.

From the foregoing description, it is apparent that the belt-slippage control mechanism of Figure 9 continuously maintains the optimum value of belt slippage for every instantaneous gear ratio. It will be apparent to those skilled in the art that the specific embodiment of the belt-slippage control illustrated in Figure 9 can be varied in a number of ways similar to those discussed in connection with the slippage control of Figures 6 and 7.

In Figure 10, another modification of the belt-slippage control of this invention is illustrated. Referring to Figure 10, an automobile engine, or other driving means is connected in any suitable manner to drive a driver shaft 101, which drives a driver pulley 102 comprising a fixed flange 103, and a movable flange 104, which is axially slidable with respect to the driver shaft 101 but is rotatably fixed thereto, the position of which may be controlled in any suitable manner, such as by the driver-pressure control disclosed herein, or by other means discussed herein. A continuous belt 105 provides a driving connection from the driver pulley 102 to a driven pulley 106, comprising a fixed flange 107 and a movable flange 108, which is axially slidable with respect to the load shaft 109 but is rotatably fixed thereto. The driven pulley 106 is connected to the load shaft 109, which may be connected through a suitable clutch and reduction gears to a driving wheel of an automobile, or may be connected to drive other equipment as desired. The pressure of the driven pulley 106 against the belt 105 is provided by a movable flange control 110, which may comprise any suitable means for applying fluid pressure against the movable flange 108, such as the means mentioned herein. Rigidly connected to the movable flange 108 is a flange backing ring 111, which has a flat surface 112 perpendicular to the load shaft 109.

A bevel gear 113, which is rigidly connected to the driver shaft 101, drives a second bevel gear 114, which is connected to one end of a flexible shaft 115. The other end of the flexible shaft 115 is connected to a driving shaft 116 of a rotatable disk 117, having a friction-drive face 118. A rotatable roller 119 having a rounded edge 120 contacting the face 118 of the rotatable disk 117, is slidably mounted on a shaft 121 so as to be movable toward and away from the axis of rotation of the rotatable disk 117. Rigidly connected to the roller 119 by a sleeve 122 is a spur gear 123, which is slidable on, and rotatable about, the shaft 121, along with the roller 119. At the end opposite the sleeve 122, the slidable spur gear 123 is rigidly connected by another sleeve 124 to a cam follower 125. The roller 119, the sleeve 122, the spur gear 123, the sleeve 124, and the cam follower 125 comprise a slidable and rotatable member, which is indicated generally by the reference numeral 126. The rotatable disk 117, and the slidable member 126 comprise a speed changer, indicated generally by the reference numeral 130. A light spring 127, retained by a ring 128 attached to the shaft 121, presses the slidable member 126 against a cam 129.

The position of the cam 129 is controlled through a pinion 131 on a cam shaft 132, the pinion 131 being driven by a rack 133 on a flange-follower rod 134. The flange-follower rod 134 has at one end an antifriction wheel 135, which bears against the flat surface 112 of the movable flange backing ring 111. Any suitable means, such as a flat spring 136, connected to a fixed point, as is indicated at 137, may be used to press the flange follower 134 against the flat surface 112 of the movable flange backing ring 111, so that the position of the flange follower 134 is determined by the position of the movable flange 108 of the driven pulley 106.

Geared to the long, slidable spur gear 123 is a spur gear 250, which is rigidly connected by a shaft 251 to a driver-end fluid-pressure-type governor 252 of the type illustrated in detail in Figure 3. The stationary pressure manifold 253 of the fluid-type governor 252 is connected by a fluid line 254 to a suitable source of fluid under a constant high pressure. The governor signal pressure, which increases as the speed of rotation of the rotatable member 255 increases, is connected through the stationary pressure manifold 253 to one end of a fluid line 256, the other end of which is connected to a right-end fluid chamber 257 of a driven-pulley pressure-control valve 258.

A bevel gear 142, which is rigidly connected to the load shaft 109, is geared to a bevel gear 259, which is rigidly connected by a shaft 260 to a driven-end fluid-pressure-type governor 261 of the type illustrated in detail in Figure 3. The stationary pressure manifold 262 of the fluid-type governor 261 is connected by a fluid line 263 to a suitable source of fluid under a constant high pressure. The governor signal pressure, which increases as the speed of rotation of the rotatable member 264 increases, is connected through the stationary pressure manifold 262 to one end of a fluid line 265, the other end of which is connected to a left-end fluid chamber 266 of the driven-pulley pressure-control valve 258.

A valve piston 267 is slidable within the cylindrical casing 268 of the driven-pulley pressure-control valve 258. The valve piston 267 comprises a cylindrical left-end portion 269, and a cylindrical right-end portion 270, rigidly held in fixed spaced relationship by a central connecting shaft 271, which provides an annular passage 272 between the left-end portion 269 and the right-end portion 270. A left-end projection 273 from the cylindrical left-end portion 269 of the valve piston 267 limits the travel of the valve piston 267 to the left to the point at which the projection 273 meets the left wall 274 of the cylindrical casing 268. A right-end projection 275 from the cylindrical right-end portion 270 of the valve piston 267 limits the travel of the valve piston 267 toward the right to the point at which the projection 275 meets the right wall 276 of the cylindrical casing 268 of the control valve 258.

The valve piston 267 normally is maintained in the neutral central position shown in Figure 10 by equal signal pressures from the driver-end governor 252 through the line 256 to the right-end fluid chamber 257, and from the driven-end governor 261 through the fluid line 265 to the left-end fluid chamber 266 of the control valve 258. A driven-pulley pressure-control line is connected to the control valve 258 at the center of the neutral position of the annular passage 272. A drain fluid line 165 is connected to the control valve 258 to the right of the neutral position of the annular passage 272. A supply pressure line 167 is connected to the control valve 258 to the left of the neutral position of the annular passage 272. The supply pressure line 167 is connected to any suitable source of fluid under high pressure, preferably in the order of 400 p. s. i. The drain fluid line 165 is connected to any suitable sump in which only a low pressure, in the order of 20 p. s. i., is present. The driven-pulley pressure-control line 163 is connected through a rotary seal 168 to the movable flange control 110 to apply fluid pressure against the movable flange 108 of the driven pulley 106.

The belt-slippage control of Figure 10 operates as follows:

The rotation of the driver pulley 102 is applied to the rotatable disk 117 of the speed changer 130 through the bevel gear 113, which is rigidly connected to the driver shaft 101, the bevel gear 114, which is geared to the bevel gear 113, and the flexible shaft 115, which is connected to the driving shaft 116 of the rotatable disk 117. The rotatable roller 119 of the slidable member 126 is driven by the friction-drive base 118 of the rotatable disk 117 through the contact of the rounded edge 120 with the base 118 of the rotatable disk 117. The gear ratio between the driver pulley 102 and the driven pulley 106 is determined by the position of the movable flange 104 of the driver pulley 102 on the driver shaft 101. This gear ratio determines the position of the movable flange 108 of the driven pulley 106 on the load shaft 109. The flange backing ring 111 is rigidly connected to the movable flange 108, and the flat surface 112 of the backing ring 111 determines the position of the flange follower 134, in accordance with the position of the movable flange 108, since the antifriction wheel 135 of the flange follower 134 is held against the flat surface 112 of the backing ring 111 by the flat spring 136. The rack 133 on the flange follower 134 is geared to the pinion 131 on the cam shaft 132 to control the position of the cam 129 in accordance with the gear ratio as indicated by the position of the movable flange 108 of the driven pulley 106. The position of the cam 129 determines the position of the slidable member 126 of the speed changer 130, since the cam follower 125 of the slidable member 126 is pressed against the cam 129 by the light spring 127. Thus, the position of the cam 129 determines the gear ratio in the speed changer 130 by controlling the position of the slidable member 126 on the shaft 121 to vary the distance of the roller 119 from the axis of rotation of the rotatable disk 117.

The cam 129 is shaped so as to vary the gear ratio in the speed changer 130 in accordance with the instantaneous gear ratio between the driver pulley 102 and the driven pulley 106, as indicated by the position of the movable flange 108 of the driven pulley 106, and in accordance with predetermined values of optimum belt slippage over the available range of gear ratios between the driver pulley 102 and the driven pulley 106. Thus, the output of the speed changer 130, which is transmitted from the long, slidable spur gear 123 through the spur gear 250 and the shaft 251, rigidly connected thereto, to the driver-end governor 252, is a rotation at a speed that depends upon the speed of rotation of the driver pulley 102, the instantaneous gear ratio between the driver pulley 102 and the driven pulley 106, and the optimum belt slippage for that gear ratio.

The rotation of the driven pulley 106 is transmitted to the driven-end governor 261 through the bevel gear 142, which is rigidly connected to the load shaft 109, and the bevel gear 259 which is geared thereto and which is rigidly connected to the shaft 260. The gear ratios from the driver pulley 102 to the driver-end governor 252, and between the driven pulley 106 and the driven-end governor 261, are so chosen that the speed of rotation of the driver-end governor 252 is equal to the speed of rotation of the driven-end governor 261 for the condition of optimum belt slippage at any available gear ratio between the driver pulley 102 and the driven pulley 106. The driver-end governor 252 is identical to the driven-end governor 261, so when the speeds of rotation of the two governors 252, 261 are equal, the fluid pressure in the right-end chamber 257 of the control valve 258 is equal to the fluid pressure in the left-end chamber 266 of the control valve 258, and the valve piston 267 is maintained in its normal neutral position, as shown in Figure 10.

If, at any time, the amount of belt slippage decreases to a value below the optimum value of belt slippage, the speed of rotation of the driven pulley 106 increases, and this increased speed of rotation is transmitted through the bevel gear 142, bevel gear 259, and the shaft 260 to the driven-end governor 261, causing the signal pressure the driven-end governor 261 to exceed the signal pressure in the driver-end governor 252. The signal pressure from the driven-end governor 261 is applied through the fluid line 265 to the left-end fluid chamber 266 of the control valve 258, causing the valve piston 267 to move to the right against the lower pressure provided by the driver-end governor 252 through the fluid line 256 to the right-end chamber 257. The movement of the valve piston 267 to the right connects the driven-pulley pressure-control line 163, through the annular passage 272, to the drain fluid line 165, thereby decreasing the fluid pressure in the movable flange control 110 against the movable flange 108 of the driven pulley 106, to increase the amount of belt slippage. The right end 276 of the casing 268 of the driven-pressure control valve 258, and the right-end projection 275 on the right-end cylindrical portion 270 of the valve piston 267, limit the travel of the valve piston 267 to the right, to prevent any further movement of the valve piston 267, if the pressure in the left-end chamber 266 should be great enough to tend to move the valve piston 267 farther to the right. When the slippage increases to the optimum value, the speed of rotation of the driven-end governor 261 decreases to a speed equal to that of the driver-end governor 252, and the fluid pressure applied from the driven-end governor 261 through the fluid line 265 to the left-end chamber 266 is reduced to equal the fluid pressure in the right-end chamber 257. Consequently, the valve piston 267 returns to its central position, as shown in Figure 10, in which the right-hand cylindrical portion 270 of the valve piston 267, covers the opening to the drain fluid line 165, and the left-hand cylindrical portion 269 of the valve piston 267 covers the opening to the supply pressure line 167. Thus, the pressure in the driven-pulley pressure line 163, which is applied against the movable flange 108 of the driven pulley 106, through the movable flange control 110, is held at the value that provides the optimum amount of belt slippage.

If, at any time, the belt slippage exceeds the optimum value, the speed of rotation of the driven pulley 106 decreases, and this decreased speed of rotation results in a reduction in the speed of rotation of the driven-end governor 261. The signal pressure from the driven-end governor 261, applied through the fluid line 265 to the left-end fluid chamber 266 of the control valve 258, is thereby reduced. Since the fluid pressure in the left-end chamber 266 is lower than the fluid pressure provided by the driver-end governor 252 through the fluid line 256 to the right-end fluid chamber 257, the valve piston 267 moves to the left, connecting the driven-pulley pressure line 163, through the annular passage 272, to the supply pressure line 167. The left-end wall 274 of the casing 268 of the driven-pressure control valve 258, and the left-end projection 273 of the cylindrical left-end portion 269 of the valve piston 267m, limit the movement of the valve piston 267 to the left, to prevent any further movement if the pressure in the left-end fluid chamber 266 should decrease to such a value that the higher pressure in the right-end fluid chamber 257 would tend to push the valve piston 267 farther to the left. The high pressure of the fluid in the supply pressure line 167 is transmitted through the annular passage 272, the driven-pulley pressure line 163, the rotary seal 168, and the movable flange control 110, to press the movable flange 108 of the driven pulley 106 tighter against the belt 105. When the slippage is reduced to the optimum value, the speed of rotation of the driven-end governor 261 is increased to equal the speed of rotation of the driver-end governor 252. The fluid pressures on each end of the valve piston 267 are thereby equalized, and the valve piston 267 returns to its neutral position, as shown in Figure 10. Thus, the pressure in the driven-pulley pressure line 163, which is applied against the movable flange 108 of the driven pulley 106, through the movable flange control 110, is held at the value that provides the optimum value of belt slippage.

As is typical in servo systems, overshoot and hunting may be present to some extent in the process of obtaining a balanced condition in this belt-slippage control system. Although the length of the detailed description of the operation of this belt-slippage control might give the impression that the operations described require a considerable length of time, it should be pointed out that the entire automatic control operation takes place very rapidly and that the distances traversed by the movable valve piston 267 in the driven-pressure control valve 258 to regulate the pressure in the driven-pulley pressure line 163 are very small. As is the case in most servo systems, this belt-slippage control system operates about a balanced condition and any variation from this balanced condition is instantaneously compensated for, so that for all practical purposes the system can be considered to be continuously maintained in a balanced condition.

From the foregoing description, it is apparent that the belt-slippage control mechanism of Figure 10 continuously maintains the optimum value of belt slippage for every instantaneous gear ratio. It will be apparent to those skilled in the art that the specific embodiment of the belt-slippage control, illustrated in Figure 10, can be varied in a number of ways similar to those discussed in connection with the slippage control of Figures 6 and 7.

Since the combination of the positive displacement pump 93 and the orifice 96, as illustrated in Figure 5, provides a fluid pressure that increases with increased speed of rotation of the positive displacement pump 93, each of the fluid-pressure-type governors 252 and 261 in the belt-slippage control system of Figure 10 could be replaced by such a combination and the belt-slippage control system would operate in the same manner. The combination of a positive displacement pump and an orifice is equivalent to a fluid-pressure-type governor as far as their use in the belt-slippage control system, as illustrated in Figure 10, is concerned, since the operation of this belt-slippage control system is based upon conditions of balance between two fluid pressures provided by equal speeds of rotation, and the specific function of fluid-pressure output against speed of rotation is unimportant as long as the fluid pressure increases with increased speed of rotation. The two devices employed to provide balanced pressure in a given belt-slippage control system, as illustrated in Figure 10, should, however, have the same fluid-pressure-against-speed functions. Other devices having the property of providing increased fluid pressure with increased speed of rotation would, of course, also be equivalents of the fluid-pressure-type governors 252 and 261 in the belt-slippage control system of Figure 10.

Since the varous forms of belt-slippage control according to this invention provide the desired control of belt slippage under conditions of constant gear ratio, as well as under conditions of varying gear ratio, they can be used to provide proper belt slippage in fixed gear-ratio transmissions as well as in variable gear-ratio transmissions. In a fixed gear-ratio transmission, one of the pulleys can be a one-piece pulley and only one pulley need have a movable flange for control of the belt slippage by control of the pressure against this movable flange. Other obvious simplifications can also be made where the belt-slippage control is applied to a fixed gear-ratio transmission. For example, the speed changer used in the belt-slippage control systems illustrated in Figures 6, 9, and 10, can be a fixed gear-ratio device, since only a constant predetermined speed change is required where the gear ratio is constant. Similarly, the variable resistance 197 in the belt-slippage control as illustrated in Figure 8 could be replaced by a fixed resistance; or it could be eliminated and the D. C. generators 184 and 193 could be selected such as to provide the proper relative voltages as functions of speed of rotation, in accordance with the fixed gear ratio of the transmission system.

It will be understood, of course, that, while the forms of the invention herein shown and described constitute preferred embodiments of the invention, it is not intended herein to illustrate all of the possible equivalent forms or ramifications of the invention; and it will also be understood that various changes in shape, relative size, and arrangement of parts may be substituted without departing from the spirit or scope of the invention herein disclosed.

What is claimed is:

1. In a variable gear-ratio transmission having, a driver pulley connected to driving means provided with a power control, said driver pulley comprising a fixed flange and a movable flange, a driven pulley comprising a fixed flange and a movable flange, and a belt between said driver pulley and said driven pulley; means for controlling the gear ratio between said driver pulley and said driven pulley comprising, in combination: means responsive to the combination of the setting of said power control and the speed of said driving means, comprising means connected to said driving means and responsive to the speed thereof and means connected to said driving-means-speed-responsive means and to said power control; and means responsive to said power-speed-combination-responsive means, to control the position of said movable flange of said driver pulley.

2. The combination of claim 1, in which said power-speed-combination-responsive means comprises means for controlling fluid pressure applied to said movable-flange-position-control means.

3. The combination of claim 1, in which said power control includes means for controlling force applied at a power-control-setting input point in said power-speed-combination-responsive means.

4. The combination of claim 1, in which said driving-means-speed-responsive means includes means for controlling fluid pressure applied at a driving-means-speed input point in said power-speed-combination-responsive means, in accordance with the speed of said driving means.

5. The combination of claim 4, in which said fluid-pressure-controlling means comprises a fluid-pressure-type governor connected to said driving means to regulate the pressure of fluid received from a source of high-pressure fluid and applied at said driving-means-speed input point, in accordance with the speed of said driving means.

6. The combination of claim 4, in which said fluid-pressure-controlling means comprises a positive displacement pump connected to said driving means to pump fluid from a sump to an orifice and through said orifice to a sump, and means for applying the fluid pressure present between said positive displacement pump and said orifice to said driving-means-speed input point.

7. The combination of claim 1, in which said movable-flange-position-control means includes means responsive to the position of said movable flange of said driver pulley.

8. The combination of claim 2, in which said movable-flange-position-control means comprises: a first valve having a piston movable in response to the fluid pressure applied thereto from said power-speed-combination responsive means; and a second valve having a pair of movable members, one said movable member being responsive to the position of said piston of said first valve, the other said movable member being responsive to the position of said movable flange of said driver pulley.

9. The combination of claim 8, in which said movable-flange-position-control means controls the pressure in means applying fluid pressure against said movable flange of said driver pulley.

10. In a variable gear-ratio transmission having, a driver pulley connected to driving means provided with a power control, said driver pulley comprising a fixed flange and a movable flange, a driven pulley comprising a fixed flange and a movable flange, and a belt between said driver pulley and said driven pulley; means for controlling the gear ratio between said driver pulley and said driven pulley comprising, in combination: means responsive to the setting of said power control; means responsive to the speed of said driving means; and means responsive to the combination of said power-control-setting-responsive means and said driving-means-speed-responsive means, to control the position of said movable flange of said driver pulley.

11. The combination of claim 10, including a source of fluid pressure, in which said power-control-setting-responsive means comprises means connected to said source of fluid pressure for controlling fluid pressure applied by said power-control-setting-responsive means at a power-control-setting input point in said combination-responsive means.

12. The combination of claim 10, in which said driving-means-speed-responsive means comprises means for providing and controlling fluid pressure applied by said driving-means-speed-responsive means at a driving-means-speed input point in said combination-responsive means.

13. The combination of claim 12, in which said fluid-pressure-providing-and-controlling means comprises a positive displacement pump connected to said driving means to pump fluid from a sump to an orifice and through said orifice to a sump, and means for applying the fluid pressure present between said positive displacement pump and said orifice to said driving-means-speed input point.

14. The combination of claim 12, in which said fluid-pressure-providing-and-controlling means comprises a source of high-pressure fluid and a fluid-pressure-type governor connected thereto and to said driving means to regulate the pressure of fluid received from said source of high-pressure fluid and applied by said governor at said driving-means-speed input point, in accordance with the speed of said driving means.

15. The combination of claim 10, in which said combination-responsive means includes means responsive to the position of said movable flange of said driver pulley.

16. The combination of claim 10, including a source of fluid pressure, in which said power-control-setting-responsive means comprises means connected to said source of fluid pressure for controlling fluid pressure applied by said power-control-setting-responsive means at a power-control-setting input point in said combination-responsive means; and in which said driving-means-speed-responsive means comprises means for providing and controlling fluid pressure applied by said driving-means-speed-responsive means at a driving-means-speed input point in said combination-responsive means.

17. The combination of claim 16, in which said combination-responsive means comprises: a first valve having a piston movable in response to the difference between said fluid pressures applied at said input points; and a second valve having a pair of movable members, one said movable member being responsive to the position of said piston of said first valve, the other said movable member being responsive to the position of said movable flange of said driver pulley.

18. The combination of claim 17, in which said combination-responsive means is connected to a source of fluid pressure and to means applying fluid pressure against said movable flange of said driver pulley, and in which said combination-responsive means controls said fluid pressure applied against said movable flange.

19. In a variable gear-ratio transmission having a driver pulley comprising a fixed flange and a movable flange, a driven pulley comprising a fixed flange and a movable flange, and a belt between said driver pulley and said driven pulley; means for continuously providing predetermined values of belt slippage comprising, in combination: means for providing a signal that is a function of the speed of rotation of said driver pulley; means for providing a signal that is a function of the speed of rotation of said driven pulley; means for modifying one said speed-function signal in accordance with the instantaneous gear ratio and a predetermined desired value of belt slippage for said gear ratio; and means responsive to any difference between said modified speed-function signal and said other speed-function signal to provide a variation in said belt slippage such as to substantially eliminate said signal difference.

20. The combination of claim 19, in which said means for modifying one said speed-function signal comprises a speed changer and means for controlling the gear ratio in said speed changer as a predetermined function of the position of one said movable flange.

21. The combination of claim 19, in which said means for modifying one said speed-function signal comprises: a speed changer having a rotatable disk geared to rotate in proportion to the rotation of one said pulley and a rotatable roller contacting a face of said disk and movable toward and away from the axis of rotation of said disk; and means for varying the position of said roller as a predetermined function of the position of one said movable flange.

22. The combination of claim 21, in which said means for varying the position of said roller comprises a cam actuated by the position of said movable flange.

23. The combination of claim 22, in which said cam is connected through a pinion to a rack whose position is determined by the position of said movable flange.

24. The combination of claim 20, in which said means responsive to any said signal difference comprises a differential gear mechanism having an input gear connected to rotate in proportion to the rotation of one said pulley, an input gear connected to rotate in proportion to the output rotation of said speed changer, and an output member so connected as to move in response to any difference between the speeds of rotation of said input gears.

25. The combination of claim 24, including adjustable valve means connected to said output member to control the pressure in means applying fluid pressure against one said movable flange.

26. In a variable gear-ratio transmission having a driver pulley comprising a fixed flange and a movable flange, a driven pulley comprising a fixed flange and a movable flange, and a belt between said driver pulley and said driven pulley; means for continuously providing predetermined values of belt slippage comprising, in combination: a shaft geared to rotate in proportion to the rotation of one said pulley; a rotatable member geared to rotate in proportion to the rotation of the other said pulley; a speed changer having a rotatable disk connected to said shaft and a rotatable roller contacting a face of said disk and movable toward and away from the axis of rotation of said disk; a cam actuated by the position of one said movable flange to vary the position of said roller as a predetermined function of the position of said movable flange; a differential gear mechanism having an input gear connected to rotate in proportion to the rotation of said rotatable member, an input gear connected to rotate in proportion to the rotation of said roller, and an output member so connected as to move in response to any difference between the speeds of rotation of said input gears; and adjustable valve means connected to said output member to control the pressure in means applying fluid pressure against one said movable flange to reduce said pressure when said slippage is below a predetermined desired value and to increase said pressure when said slippage is above said predetermined desired value.

27. The combination of claim 19, in which said means responsive to any said signal difference includes adjustable valve means connected so as to control the pressure in means applying fluid pressure against one said movable flange to reduce said pressure when said slippage is below said predetermined desired value and to increase said pressure when said slippage is above said predetermined desired value.

28. The combination of claim 19, in which said means for providing said speed-function signals comprise: a generator whose output voltage is a function of its speed of rotation, geared to rotate in proportion to the rotation of said driver pulley; and a generator whose output voltage is a function of its speed of rotation, geared to rotate in proportion to the rotation of said driven pulley; and in which said means for modifying one said speed function signal comprises a variable resistance in series with one said generator, and means for controlling the value of said variable resistance as a predetermined function of the position of one said movable flange.

29. The combination of claim 28, in which said means responsive to any said signal difference comprises: a coil connected through said variable resistance to the output voltage of one said generator so as to produce a magnetic field; a coil connected to the output of the other said generator so as to produce an opposing magnetic field; and a magnetic member so constructed and positioned as to be movable in response to any difference between said magnetic fields.

30. The combination of claim 29, including adjustable valve means connected to said magnetic member to control the pressure in means applying fluid pressure against one said movable flange.

31. The combination of claim 20, in which said means responsive to any said signal difference comprises a displacement pump actuated by the rotation of one said pulley, a displacement pump actuated by the output rotation of said speed changer, fluid lines connecting said pumps in series to circulate a fluid to and from a sump, and a pressure-responsive valve so connected as to be actuated by the pressure in the fluid line connected between said pumps to control the pressure in means applying fluid pressure against one said movable flange.

32. The combination of claim 20, in which said means responsive to any said signal difference comprises means for providing a fluid pressure that increases with increased speed of rotation of one said pulley, means for providing a fluid pressure that increases with increased speed of output rotation of said speed changer, and means responsive to any difference between said fluid pressures.

33. The combination of claim 32, in which said means responsive to said difference in fluid pressures includes adjustable valve means to which said fluid pressures are applied at spaced points in said adjustable valve means to provide opposing forces on a movable member therein.

34. The combination of claim 33, in which said adjustable valve means controls the pressure in means applying fluid pressure against one said movable flange.

35. The combination of claim 20, in which said means responsive to any said signal difference comprises a first fluid-pressure-type governor having a rotatable member connected to rotate in proportion to the rotation of one said pulley, to provide a fluid pressure that is a function of the speed of said rotation, a second fluid-pressure-type governor having a rotatable member connected to rotate in proportion to the output rotation of said speed changer to provide a fluid-pressure that is a function of the speed of said rotation, and means responsive to any difference in the fluid pressures provided by said governors.

36. In a transmission in which a belt transmits power from one pulley to another pulley, and in which at least one said pulley comprises a fixed flange and a movable flange, means for continuously regulating the value of belt slippage comprising, in combination: means for providing a signal that is a function of the speed of rotation of one said pulley; means for providing a signal that is a function of the speed of rotation of the other said pulley; means for modifying one said speed-function signal in accordance with a predetermined desired belt-slippage characteristic; and means responsive to any difference between said modified speed-function signal and said other speed-function signal to provide a variation in said belt slippage such as to substantially eliminate said signal difference.

37. The combination of claim 36, in which said means to provide a variation in said belt slippage includes means for controlling the pressure in means applying fluid pressure against one said movable flange.

38. The combination of claim 36, in which said means to provide a variation in said belt slippage includes adjustable valve means connected so as to control the pressure in means applying fluid pressure against one said movable flange to reduce said pressure when said slippage is below a predetermined desired value and to increase said pressure when said slippage is above said predetermined desired value.

References Cited in the file of this patent

UNITED STATES PATENTS

| | | |
|---|---|---|
| 2,611,227 | Keller | Sept. 23, 1952 |
| 2,611,279 | Bergsten et al. | Sept. 23, 1952 |